(12) United States Patent (10) Patent No.: US 8,439,546 B2
Griffiths et al. (45) Date of Patent: May 14, 2013

(54) LARGE AREA LIGHT PANEL AND SCREEN

(75) Inventors: Jonathan C Griffiths, Fremont, CA (US); Gaurav Sethi, Dublin, CA (US); James R Webster, San Jose, CA (US)

(73) Assignee: Qualcomm MEMS Technologies, Inc., San Diego, CA (US)

( * ) Notice: Subject to any disclaimer, the term of this patent is extended or adjusted under 35 U.S.C. 154(b) by 0 days.

(21) Appl. No.: 13/479,149

(22) Filed: May 23, 2012

(65) Prior Publication Data

US 2012/0230054 A1 Sep. 13, 2012

Related U.S. Application Data

(62) Division of application No. 12/482,294, filed on Jun. 10, 2009, now Pat. No. 8,231,257.

(60) Provisional application No. 61/144,352, filed on Jan. 13, 2009.

(51) Int. Cl.
*F21V 7/04* (2006.01)

(52) U.S. Cl.
USPC .......... 362/605; 362/618; 362/619; 362/624; 362/625

(58) Field of Classification Search ........... 362/607, 362/602–605, 617–629, 558, 293, 23.09, 362/23.1, 23.16, 23.17
See application file for complete search history.

(56) References Cited

U.S. PATENT DOCUMENTS

| | | | |
|---|---|---|---|
| 4,282,862 A | 8/1981 | Soleau | |
| 4,375,312 A | 3/1983 | Tangonan | |
| 4,460,940 A * | 7/1984 | Mori | ............................ 362/558 |
| 4,471,412 A | 9/1984 | Mori | |
| 4,497,974 A | 2/1985 | Deckman et al. | |
| 4,850,682 A | 7/1989 | Gerritsen | |
| 4,947,291 A | 8/1990 | McDermott | |
| 5,206,747 A | 4/1993 | Wiley et al. | |
| 5,231,532 A | 7/1993 | Magel et al. | |
| 5,291,314 A | 3/1994 | Agranat et al. | |

(Continued)

FOREIGN PATENT DOCUMENTS

| | | |
|---|---|---|
| CN | 2056903 | 5/1990 |
| DE | 3402746 | 8/1985 |

(Continued)

OTHER PUBLICATIONS

Aratani K., et al., Surface micromachined tuneable interferometer array, Sensors and Actuators, pp. 17-23. (1994).

(Continued)

*Primary Examiner* — Bao Q Truong
(74) *Attorney, Agent, or Firm* — Knobbe, Martens, Olson & Bear LLP

(57) ABSTRACT

Embodiments of a panel lighting apparatus and methods of its manufacture are described. In one embodiment, the apparatus can include a light source, an at least partially transparent panel comprising a planar front surface and a planar back surface, the panel disposed in conjunction with the light source such that light from the light source is input into at least one edge of the panel and guided therein, and a plurality of light extraction dots disposed on the planar back surface, the plurality of light extraction dots configured to reflect light incident on the planar back surface and extract light from the light source propagating in the panel through the planar front surface.

27 Claims, 11 Drawing Sheets

U.S. PATENT DOCUMENTS

| | | |
|---|---|---|
| 5,311,360 A | 5/1994 | Bloom et al. |
| 5,422,683 A | 6/1995 | Tanigaki |
| 5,467,417 A | 11/1995 | Nakamura et al. |
| 5,506,929 A | 4/1996 | Tai et al. |
| 5,515,184 A | 5/1996 | Caulfield et al. |
| 5,544,268 A | 8/1996 | Bischel et al. |
| 5,555,160 A | 9/1996 | Tawara et al. |
| 5,569,332 A | 10/1996 | Glatfelter et al. |
| 5,592,332 A | 1/1997 | Nishio et al. |
| 5,594,830 A | 1/1997 | Winston et al. |
| 5,650,865 A | 7/1997 | Smith |
| 5,659,410 A | 8/1997 | Koike et al. |
| 5,671,994 A | 9/1997 | Tai et al. |
| 5,703,667 A | 12/1997 | Ochiai |
| 5,712,694 A | 1/1998 | Taira et al. |
| 5,735,590 A | 4/1998 | Kashima et al. |
| 5,777,589 A | 7/1998 | Gale et al. |
| 5,783,614 A | 7/1998 | Chen et al. |
| 5,808,708 A | 9/1998 | Oyama et al. |
| 5,810,464 A | 9/1998 | Ishikawa et al. |
| 5,854,872 A | 12/1998 | Tai |
| 5,883,684 A | 3/1999 | Millikan et al. |
| 5,913,594 A | 6/1999 | Iimura |
| 5,982,540 A | 11/1999 | Koike et al. |
| 6,002,829 A | 12/1999 | Winston et al. |
| 6,014,192 A | 1/2000 | Lehureau et al. |
| 6,021,007 A | 2/2000 | Murtha |
| 6,040,937 A | 3/2000 | Miles |
| 6,048,071 A | 4/2000 | Sawayama |
| 6,094,285 A | 7/2000 | Wickham et al. |
| 6,151,089 A | 11/2000 | Yang et al. |
| 6,158,156 A | 12/2000 | Patrick |
| 6,195,196 B1 | 2/2001 | Kimura et al. |
| 6,196,691 B1 | 3/2001 | Ochiai |
| 6,199,989 B1 | 3/2001 | Maeda et al. |
| 6,211,853 B1 | 4/2001 | Takeuchi et al. |
| 6,229,084 B1 | 5/2001 | Katsu |
| 6,259,854 B1 | 7/2001 | Shinji et al. |
| 6,273,577 B1 | 8/2001 | Goto et al. |
| 6,292,504 B1 | 9/2001 | Halmos |
| 6,305,813 B1 | 10/2001 | Lekson et al. |
| 6,369,947 B1 | 4/2002 | Staub et al. |
| 6,379,017 B2 | 4/2002 | Nakabayashi et al. |
| 6,392,368 B1 | 5/2002 | Deller et al. |
| 6,402,325 B1 | 6/2002 | Yamamoto |
| 6,407,785 B1 | 6/2002 | Yamazaki |
| 6,412,969 B1 | 7/2002 | Torihara et al. |
| 6,421,103 B2 | 7/2002 | Yamaguchi |
| 6,512,626 B1 | 1/2003 | Schmidt |
| 6,592,234 B2 | 7/2003 | Epstein et al. |
| 6,598,987 B1 | 7/2003 | Parikka |
| 6,601,984 B2 | 8/2003 | Yamamoto et al. |
| 6,630,968 B1 | 10/2003 | Tsuchihashi et al. |
| 6,642,913 B1 | 11/2003 | Kimura et al. |
| 6,657,683 B2 | 12/2003 | Richard |
| 6,667,782 B1 | 12/2003 | Taira et al. |
| 6,669,350 B2 | 12/2003 | Yamashita et al. |
| 6,674,562 B1 | 1/2004 | Miles et al. |
| 6,706,339 B1 | 3/2004 | Miyatake et al. |
| 6,747,785 B2 | 6/2004 | Chen et al. |
| 6,747,801 B2 | 6/2004 | Umemoto et al. |
| 6,773,126 B1 | 8/2004 | Hatjasalo et al. |
| 6,778,746 B2 | 8/2004 | Charlton et al. |
| 6,799,860 B2 | 10/2004 | Nakaoka et al. |
| 6,829,258 B1 | 12/2004 | Carlisle et al. |
| 6,853,129 B1 | 2/2005 | Cummings et al. |
| 6,865,312 B2 | 3/2005 | Niv et al. |
| 6,871,982 B2 | 3/2005 | Holman et al. |
| 6,879,354 B1 | 4/2005 | Sawayama et al. |
| 6,883,924 B2 | 4/2005 | Maeda et al. |
| 6,891,530 B2 | 5/2005 | Umemoto et al. |
| 6,891,658 B2 | 5/2005 | Whitehead et al. |
| 6,892,009 B2 | 5/2005 | Ito et al. |
| 6,896,386 B2 | 5/2005 | Kitazawa et al. |
| 6,951,401 B2 | 10/2005 | Van Hees et al. |
| 6,967,779 B2 | 11/2005 | Fadel et al. |
| 6,972,753 B1 | 12/2005 | Kimura et al. |
| 6,998,196 B2 | 2/2006 | Rich et al. |
| 7,010,212 B2 | 3/2006 | Emmons et al. |
| 7,014,349 B2 | 3/2006 | Shinohara et al. |
| 7,018,088 B2 | 3/2006 | Yu et al. |
| 7,041,344 B2 | 5/2006 | Kusume et al. |
| 7,042,643 B2 | 5/2006 | Miles |
| 7,072,096 B2 | 7/2006 | Holman et al. |
| 7,110,158 B2 | 9/2006 | Miles |
| 7,123,216 B1 | 10/2006 | Miles |
| 7,128,459 B2 | 10/2006 | Igarashi et al. |
| 7,133,022 B2 | 11/2006 | Grabert |
| 7,210,806 B2 | 5/2007 | Holman et al. |
| 7,218,812 B2 | 5/2007 | Maxwell et al. |
| 7,223,010 B2 | 5/2007 | Min et al. |
| 7,234,854 B2 * | 6/2007 | Masamoto .................... 362/612 |
| 7,262,754 B1 | 8/2007 | Yamazaki |
| 7,262,916 B2 | 8/2007 | Kao et al. |
| 7,278,774 B2 | 10/2007 | Chang |
| 7,327,510 B2 | 2/2008 | Cummings et al. |
| 7,352,501 B2 | 4/2008 | Chopra et al. |
| 7,360,899 B2 | 4/2008 | McGuire et al. |
| 7,360,939 B2 | 4/2008 | Sugiura |
| 7,376,308 B2 | 5/2008 | Cheben et al. |
| 7,380,970 B2 | 6/2008 | Hwang et al. |
| 7,400,439 B2 | 7/2008 | Holman et al. |
| 7,417,784 B2 | 8/2008 | Sasagawa et al. |
| 7,450,295 B2 | 11/2008 | Tung et al. |
| 7,520,642 B2 | 4/2009 | Holman et al. |
| 7,573,631 B1 | 8/2009 | Amm |
| 7,656,391 B2 | 2/2010 | Kimura et al. |
| 7,663,714 B2 | 2/2010 | Haga et al. |
| 7,706,050 B2 | 4/2010 | Sampsell |
| 7,733,439 B2 | 6/2010 | Sampsell et al. |
| 7,766,531 B2 | 8/2010 | Anderson et al. |
| 7,864,395 B2 | 1/2011 | Chui |
| 8,231,257 B2 * | 7/2012 | Griffiths et al. ................ 362/605 |
| 2001/0006066 A1 | 7/2001 | Cherney et al. |
| 2001/0011551 A1 | 8/2001 | Peumans et al. |
| 2001/0019479 A1 | 9/2001 | Nakabayashi et al. |
| 2001/0022636 A1 | 9/2001 | Yang et al. |
| 2001/0030861 A1 | 10/2001 | Oda et al. |
| 2001/0055076 A1 | 12/2001 | Ochi et al. |
| 2001/0055208 A1 | 12/2001 | Kimura |
| 2002/0044445 A1 | 4/2002 | Bohler et al. |
| 2002/0048444 A1 | 4/2002 | Sung et al. |
| 2002/0054258 A1 | 5/2002 | Kondo et al. |
| 2002/0054424 A1 | 5/2002 | Miles |
| 2002/0106182 A1 | 8/2002 | Kawashima |
| 2002/0113241 A1 | 8/2002 | Kubota et al. |
| 2002/0172039 A1 | 11/2002 | Inditsky |
| 2002/0180910 A1 | 12/2002 | Umemoto et al. |
| 2003/0016930 A1 | 1/2003 | Inditsky |
| 2003/0026536 A1 | 2/2003 | Ho |
| 2003/0030764 A1 | 2/2003 | Lee |
| 2003/0034445 A1 | 2/2003 | Boyd et al. |
| 2003/0046842 A1 | 3/2003 | Maas |
| 2003/0067760 A1 | 4/2003 | Jagt et al. |
| 2003/0071947 A1 | 4/2003 | Shiraogawa et al. |
| 2003/0083429 A1 | 5/2003 | Smith et al. |
| 2003/0086030 A1 | 5/2003 | Taniguchi et al. |
| 2003/0086031 A1 | 5/2003 | Taniguchi et al. |
| 2003/0090887 A1 | 5/2003 | Igarashi et al. |
| 2003/0095401 A1 | 5/2003 | Hanson et al. |
| 2003/0103344 A1 | 6/2003 | Niida et al. |
| 2003/0123245 A1 | 7/2003 | Parker et al. |
| 2003/0128538 A1 | 7/2003 | Shinohara et al. |
| 2003/0160919 A1 | 8/2003 | Suzuki et al. |
| 2003/0165067 A1 | 9/2003 | Imamura et al. |
| 2003/0169385 A1 | 9/2003 | Okuwaki |
| 2003/0184989 A1 | 10/2003 | Matsumoto et al. |
| 2003/0210222 A1 | 11/2003 | Ogiwara et al. |
| 2003/0210367 A1 | 11/2003 | Nakano et al. |
| 2004/0001169 A1 | 1/2004 | Saiki et al. |
| 2004/0032659 A1 | 2/2004 | Drinkwater |
| 2004/0080807 A1 | 4/2004 | Chen et al. |
| 2004/0090765 A1 | 5/2004 | Yu et al. |
| 2004/0135494 A1 | 7/2004 | Miyatake |
| 2004/0145811 A1 | 7/2004 | Lin et al. |
| 2004/0170373 A1 | 9/2004 | Kim |
| 2004/0207995 A1 | 10/2004 | Park et al. |

| | | | | | | |
|---|---|---|---|---|---|---|
| 2004/0228109 | A1 | 11/2004 | Leu et al. | | | |
| 2004/0228112 | A1 | 11/2004 | Takata | | | |
| 2004/0246743 | A1 | 12/2004 | Lee et al. | | | |
| 2005/0002175 | A1 | 1/2005 | Matsui et al. | | | |
| 2005/0024890 | A1 | 2/2005 | Yamamoto et al. | | | |
| 2005/0046011 | A1 | 3/2005 | Chen et al. | | | |
| 2005/0069254 | A1 | 3/2005 | Schultheis et al. | | | |
| 2005/0088719 | A1 | 4/2005 | Patel et al. | | | |
| 2005/0116924 | A1 | 6/2005 | Sauvante et al. | | | |
| 2005/0117190 | A1 | 6/2005 | Iwauchi et al. | | | |
| 2005/0133761 | A1 | 6/2005 | Thielemans | | | |
| 2005/0141065 | A1 | 6/2005 | Masamoto | | | |
| 2005/0179977 | A1 | 8/2005 | Chui et al. | | | |
| 2005/0185416 | A1 | 8/2005 | Lee et al. | | | |
| 2005/0231981 | A1 | 10/2005 | Hoelen et al. | | | |
| 2005/0259302 | A9 | 11/2005 | Metz et al. | | | |
| 2005/0259939 | A1 | 11/2005 | Rinko | | | |
| 2005/0270798 | A1 | 12/2005 | Lee et al. | | | |
| 2005/0271325 | A1 | 12/2005 | Anderson et al. | | | |
| 2006/0002141 | A1 | 1/2006 | Ouderkirk et al. | | | |
| 2006/0002675 | A1 | 1/2006 | Choi et al. | | | |
| 2006/0024017 | A1 | 2/2006 | Page et al. | | | |
| 2006/0044246 | A1 | 3/2006 | Mignard | | | |
| 2006/0044523 | A1 | 3/2006 | Teijido et al. | | | |
| 2006/0061705 | A1 | 3/2006 | Onishi | | | |
| 2006/0066783 | A1 | 3/2006 | Sampsell | | | |
| 2006/0067651 | A1 | 3/2006 | Chui | | | |
| 2006/0077617 | A1 | 4/2006 | Floyd | | | |
| 2006/0110090 | A1 | 5/2006 | Ellwood | | | |
| 2006/0132383 | A1 | 6/2006 | Gally et al. | | | |
| 2006/0181903 | A1 | 8/2006 | Okuwaki | | | |
| 2006/0187676 | A1 | 8/2006 | Ishikura | | | |
| 2006/0215958 | A1 | 9/2006 | Yeo et al. | | | |
| 2006/0262562 | A1 | 11/2006 | Fukasawa et al. | | | |
| 2006/0265919 | A1 | 11/2006 | Huang | | | |
| 2006/0268574 | A1 | 11/2006 | Jung et al. | | | |
| 2006/0274243 | A1 | 12/2006 | Iijima et al. | | | |
| 2006/0279558 | A1 | 12/2006 | Van Delden et al. | | | |
| 2007/0001187 | A1 | 1/2007 | Kim | | | |
| 2007/0116424 | A1 | 5/2007 | Ting et al. | | | |
| 2007/0133226 | A1 | 6/2007 | Mi | | | |
| 2007/0147087 | A1 | 6/2007 | Parker et al. | | | |
| 2007/0187852 | A1 | 8/2007 | Parker et al. | | | |
| 2007/0189036 | A1 | 8/2007 | Chen et al. | | | |
| 2007/0247872 | A1 | 10/2007 | Lee et al. | | | |
| 2007/0279727 | A1 | 12/2007 | Gandhi et al. | | | |
| 2007/0292091 | A1 | 12/2007 | Fujii et al. | | | |
| 2008/0018617 | A1 | 1/2008 | Ng et al. | | | |
| 2008/0079870 | A1 | 4/2008 | Kazuhiro et al. | | | |
| 2008/0089092 | A1 | 4/2008 | Lee et al. | | | |
| 2008/0090025 | A1 | 4/2008 | Freking | | | |
| 2008/0094853 | A1 | 4/2008 | Kim et al. | | | |
| 2008/0232135 | A1 | 9/2008 | Kinder et al. | | | |
| 2008/0239755 | A1 | 10/2008 | Parker et al. | | | |
| 2008/0278460 | A1 | 11/2008 | Arnett et al. | | | |
| 2008/0278663 | A1* | 11/2008 | Krishnan et al. | 349/95 | | |
| 2008/0285307 | A1* | 11/2008 | Aylward et al. | 362/618 | | |
| 2009/0015753 | A1 | 1/2009 | Ye | | | |
| 2009/0025786 | A1 | 1/2009 | Rohatgi et al. | | | |
| 2009/0078316 | A1 | 3/2009 | Khazeni et al. | | | |
| 2009/0086466 | A1 | 4/2009 | Sugita et al. | | | |
| 2009/0096956 | A1 | 4/2009 | Uehara et al. | | | |
| 2009/0126777 | A1 | 5/2009 | Khazeni et al. | | | |
| 2009/0135469 | A1 | 5/2009 | Lee et al. | | | |
| 2009/0147332 | A1 | 6/2009 | Bita et al. | | | |
| 2009/0168459 | A1 | 7/2009 | Holman et al. | | | |
| 2009/0244690 | A1 | 10/2009 | Lee | | | |
| 2009/0296193 | A1 | 12/2009 | Bita et al. | | | |
| 2010/0051089 | A1 | 3/2010 | Khazeni et al. | | | |
| 2010/0053148 | A1 | 3/2010 | Khazeni et al. | | | |
| 2010/0096718 | A1 | 4/2010 | Hynecek et al. | | | |
| 2010/0118563 | A1 | 5/2010 | Shen et al. | | | |
| 2010/0142226 | A1 | 6/2010 | Vogt et al. | | | |
| 2010/0157624 | A1 | 6/2010 | Liao et al. | | | |
| 2010/0231510 | A1 | 9/2010 | Sampsell et al. | | | |
| 2010/0302803 | A1 | 12/2010 | Bita et al. | | | |
| 2010/0309687 | A1 | 12/2010 | Sampsell et al. | | | |
| 2011/0122479 | A1 | 5/2011 | Sampsell | | | |
| 2012/0230053 | A1 | 9/2012 | Griffiths et al. | | | |

FOREIGN PATENT DOCUMENTS

| | | |
|---|---|---|
| DE | 199 42 513 | 3/2001 |
| EP | 0 278 038 | 8/1988 |
| EP | 0 362 993 | 4/1990 |
| EP | 0 539 099 | 4/1993 |
| EP | 0 590 511 | 4/1994 |
| EP | 0 621 500 | 10/1994 |
| EP | 0 879 991 | 11/1998 |
| EP | 0 907 050 | 4/1999 |
| EP | 1 003 062 | 5/2000 |
| EP | 1 116 987 | 7/2001 |
| EP | 1 122 586 | 8/2001 |
| EP | 1 251 454 | 4/2002 |
| EP | 1 271 223 | 6/2002 |
| EP | 1 279 892 | 1/2003 |
| EP | 1 329 664 | 7/2003 |
| EP | 1 336 876 | 8/2003 |
| EP | 1 347 315 | 9/2003 |
| EP | 1 389 775 | 2/2004 |
| EP | 1 413 543 | 4/2004 |
| EP | 1 437 610 | 7/2004 |
| EP | 1 544 537 | 6/2005 |
| EP | 1 577 701 | 9/2005 |
| EP | 1 698 918 | 9/2006 |
| EP | 1 734 401 | 12/2006 |
| EP | 1 762 778 | 3/2007 |
| EP | 1 928 028 | 6/2008 |
| EP | 1 975 651 | 10/2008 |
| FR | 2 824 643 | 11/2002 |
| GB | 2 260 203 | 4/1993 |
| GB | 2 321 532 | 7/1998 |
| GB | 2 331 615 | 5/1999 |
| GB | 2 336 933 | 11/1999 |
| GB | 2 351 834 | 1/2001 |
| JP | 60-242408 | 12/1985 |
| JP | 2-3993 | 1/1990 |
| JP | 3-30419 | 2/1991 |
| JP | 07-199829 | 8/1995 |
| JP | 09-022012 | 1/1997 |
| JP | 09-171111 | 6/1997 |
| JP | 09-281917 | 10/1997 |
| JP | 09-311333 | 12/1997 |
| JP | 11-52887 | 2/1999 |
| JP | 11-211999 | 8/1999 |
| JP | 11-224524 | 8/1999 |
| JP | 11-227248 | 8/1999 |
| JP | 11-232919 | 8/1999 |
| JP | 11-326898 | 11/1999 |
| JP | 2000-075293 | 3/2000 |
| JP | 2000-193933 | 11/2000 |
| JP | 2000-314882 | 11/2000 |
| JP | 2001-243822 | 9/2001 |
| JP | 2001-297615 | 10/2001 |
| JP | 2001-320092 | 11/2001 |
| JP | 2002-090549 | 3/2002 |
| JP | 2002-108227 | 4/2002 |
| JP | 2002-163907 | 6/2002 |
| JP | 2002-174732 | 6/2002 |
| JP | 2002-174780 | 6/2002 |
| JP | 2002-245835 | 12/2002 |
| JP | 2003-045678 | 2/2003 |
| JP | 2003-057652 | 2/2003 |
| JP | 2003-057653 | 2/2003 |
| JP | 2003-066451 | 3/2003 |
| JP | 2003-140118 | 5/2003 |
| JP | 2003-149642 | 5/2003 |
| JP | 2004-149643 | 5/2003 |
| JP | 2003-173713 | 6/2003 |
| JP | 2003-344881 | 12/2003 |
| JP | 2003-347563 | 12/2003 |
| JP | 2004-012918 | 1/2004 |
| JP | 2004-062099 | 2/2004 |
| JP | 2004-087409 | 3/2004 |
| JP | 2004-103692 | 4/2004 |
| JP | 2004-186024 | 7/2004 |
| JP | 2004-212673 | 7/2004 |
| JP | 2005-183871 | 7/2005 |
| JP | 2005-259365 | 9/2005 |
| JP | 2005316178 | 11/2005 |

| | | |
|---|---|---|
| JP | 2006-075362 | 3/2006 |
| JP | 2006 107993 | 4/2006 |
| JP | 2008-103110 | 5/2008 |
| KR | 10-0754400 | 8/2007 |
| KR | 10-2008-0088683 | 10/2008 |
| TW | 567388 | 12/2003 |
| WO | WO 95/01584 | 1/1995 |
| WO | WO 95/14256 | 5/1995 |
| WO | WO 98/19201 | 5/1998 |
| WO | WO 98/32047 | 7/1998 |
| WO | WO 99/63394 | 12/1999 |
| WO | WO 99/64785 | 12/1999 |
| WO | WO 01/29148 | 4/2001 |
| WO | WO 01/57434 | 8/2001 |
| WO | WO 01/59362 | 8/2001 |
| WO | WO 01/84228 | 11/2001 |
| WO | WO 01/84229 | 11/2001 |
| WO | WO 02/06858 | 1/2002 |
| WO | WO 02/25359 | 3/2002 |
| WO | WO 01/06816 | 8/2002 |
| WO | WO 02/097324 | 12/2002 |
| WO | 03007049 | 1/2003 |
| WO | WO 03/032058 | 4/2003 |
| WO | WO 03/038509 | 5/2003 |
| WO | WO 03/056876 | 7/2003 |
| WO | WO 03/062912 | 7/2003 |
| WO | WO 2004/088372 | 10/2004 |
| WO | WO 2004/114418 | 12/2004 |
| WO | WO 2005/001892 | 1/2005 |
| WO | WO 2005/011012 | 2/2005 |
| WO | WO 2005/073622 | 8/2005 |
| WO | WO 2005/088367 | 9/2005 |
| WO | WO 2006/035698 | 4/2006 |
| WO | WO 2007/064133 | 6/2007 |
| WO | WO 2008/038754 | 4/2008 |
| WO | WO 2008/045200 | 4/2008 |
| WO | WO 2008/045207 | 4/2008 |
| WO | WO 2008/045224 | 4/2008 |
| WO | WO 2008/047274 | 4/2008 |
| WO | WO 2008/062363 | 5/2008 |
| WO | WO 2008/122915 | 10/2008 |
| WO | WO 2009/011922 | 1/2009 |

OTHER PUBLICATIONS

Bass, Handbook of Optics, vol. I, Fundamentals, Techniques, and Design, Second Edition, McGraw-Hill, Inc., New York, pp. 2.29-2.36 (1995).
Zhou et al., Waveguide Panel Display Using Electromechanical Spatial Modulators, SID Digest, vol. XXIX, 1998.
ISR and WO dated Dec. 30, 2009 in PCT/US09/055527.
IPRP dated Jul. 27, 2010 in PCT/US09/055527.
Invitation to Pay Additional Fees dated Oct. 1, 2009 in PCT/US09/046941.
ISR and WO dated Jan. 14, 2010 in PCT/US09/046941.
IPRP dated May 10, 2011 in PCT/US09/046941.
Office Action dated Nov. 17, 2011 in U.S. Appl. No. 12/482,294.
Amm et al., May 19, 1998, 5.2: Grating light valve technology: update and novel applications, SID Symposium.

* cited by examiner

LARGE AREA LIGHT PANEL AND SCREEN

CROSS-REFERENCE TO RELATED APPLICATIONS

This application is a divisional application of U.S. application Ser. No. 12/482,294, filed Jun. 10, 2009, which claims the benefit of U.S. Provisional Application No. 61/144,352 filed on Jan. 13, 2009, both of which are hereby expressly incorporated by reference in their entireties.

BACKGROUND

1. Field of the Invention

The invention relates to the field of lighting, and in particular, light extraction in light panels and privacy displays.

2. Description of the Related Art

A variety of architectural lighting configurations are utilized to provide artificial illumination in a wide variety of indoor and/or outdoor locations. Such configurations can include fixed and portable architectural lighting. Various configurations can employ technologies such as incandescent, fluorescent, and/or light emitting diode based light sources.

One type of architectural lighting configuration can be referred to generally as panel lighting. Panel lights may include, for example, fluorescent lighting in a light box behind a plastic lenticular panel. Panel lighting is often configured as planar and square or rectangular and having width and length dimensions significantly greater than a thickness dimension. While the thickness of panel lighting is generally significantly less than corresponding width and length dimensions, it is frequently the case that the thickness of existing panel lighting forces limitations in installation and use. Display front and backlight techniques can be applied to large area (such as 4'×8') flat panel lighting.

One specific type of panel lighting is flat panel lighting. Flat panel lights are commonly found in flat panel display applications, which include a transparent panel designed to provide illumination from its planar surface. Light is provided into the panel from a light source (e.g., LEDs or a CCFL lamp), which may be positioned along one or more edges of the panel. Light travels throughout the panel, staying within the panel due to total internal reflection at its front planar surface and back planar surface. At some places on the panel, light may be directed out of the panel by an extraction feature.

Flat light panels can be sized for luminaire or architectural applications. For architectural applications a panel may be about 4'×8', or made of tiles of smaller dimensions. Some embodiments include two or more flat light panels adjacently disposed. Thus, flat panel lights can be applied to large areas. Flat panel lights can be used as a luminaire or as a partially transparent light panel and screen. For example, a flat panel light may be used as a privacy screen. The panel can be glass, polymer such as acrylic, polyethylene terephthalate, polycarbonate etc. A 4'×8' panel may require a thickness of about 0.25" or greater to allow adequate transmission of light along its width, when illuminated from two edges.

In existing panel designs, light extraction features are often grooves or other features cut into the surface of the panel. However, these machined or embossed features are costly and do not allow for flexibility in design.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments," one will understand how the features of this invention provide advantages over other lighting devices.

Certain embodiments of the invention include light extraction dots painted or printed onto a light panel privacy screen. Privacy screen panels can include light extraction dots that, when illuminated, obscure viewing objects behind the screen. For ease of manufacturing the dots can be printed onto the panel. In some embodiments, the panel is configured with dots in a configuration to decouple the optical characteristics of light entering a front surface of the panel and transmitted through the panel and out the back surface, and light extracted out of the front surface. In other words, the panel can be configured to have a different visual (or optical) effect when the panel is viewed from either its front or back surface.

According to one embodiment, the invention comprises a lighting apparatus comprising a light source, an at least partially transparent panel comprising a planar back surface and a planar front surface, the panel disposed in conjunction with the light source such that light from the light source is input into at least one edge of the panel and propagates therein and a plurality of light extraction features disposed on the panel back surface, the plurality of light extraction features configured to reflect light incident on the panel back surface and extract light from the light source propagating in the panel through the panel front surface. In one aspect, the at least one light extraction feature comprises an inner layer disposed near the panel back surface and an outer layer disposed at least partially on the inner layer. In another aspect, part of the outer layer is disposed on the panel back surface. In one example, the outer layer may comprise a first colored material that reflects light of a first color and the inner layer may comprise a second colored material that reflects light of a second color, the first color may be different from the second color or the same. In one example, the first color is white. In another aspect, a reflector is disposed adjacent to the planar front surface and/or a diffuser is disposed adjacent the panel back surface. In one example, the panel may comprise glass, polymer, polycarbonate, or polyethylene terephthalate.

In another embodiment, the lighting apparatus may comprise an isolation layer disposed between at least one, or at least a portion of one, light extraction feature and the panel back surface and the isolation layer may have a refractive index that is less than the refractive index of the panel. In one example, the isolation layer may include two or more sections with each section disposed between at least a portion of a light extraction feature and the panel such that the isolation layer is not disposed between a portion of one light extraction feature and the panel. In another example, the isolation layer may be disposed between non-extraction features and the panel as well as between light extraction features and the panel. In another aspect, an isolation layer may be disposed between a portion of at least one light extraction feature and the back panel surface such that the isolation layer is not disposed between another portion of the at least one light extraction feature and the back panel surface. In one example, at least one light extraction feature may be disposed on the panel back surface without an isolation layer therebetween.

In one embodiment, the light extraction features comprise at least one light extraction dot and the dot may comprise material that can be printed or painted onto the panel back surface. In one example, the dot material may comprise ink or ink with an ink binder having a refractive index equal to or less than the refractive index of the panel. In another aspect, the dot material may comprise diffusive particles. In one example, the light extraction features comprise a binder material and a plurality of diffusive particles. In one aspect, the diffusive particles comprise titanium dioxide or zinc oxide. In another example, the refractive index of the diffusive particles is greater than the refractive index of the binder material.

In another aspect, the lighting apparatus may comprise at least one secondary dot disposed on the panel back surface and the at least one secondary dots may extract less light than the plurality of light extraction dots. In one example, the light extraction dots and secondary dots may be disposed together in a pattern with uniform spacing. In another aspect, the light extraction dots may be disposed upon at least one side of the panel and patterned to uniformly or non-uniformly extract at least some light from the panel. In another example, the light extraction characteristic is the ink binder refractive index or the number of diffusive particles. In one aspect, the lighting apparatus may include a group of light extraction features on the panel front surface and they may be disposed in a uniform or non-uniform pattern. The light extraction features disposed on the panel front surface may comprise light extraction features of differing sizes. In one example, at least two of the light extraction features on the front may comprise dots with different diameters, thicknesses, refractive indices, or different numbers of diffusive particles. In another example, the lighting apparatus may include a group of light extraction features on the panel front surface and a group of light extraction features on the panel back surface with at least one light extraction feature on the back surface comprising a dot with a different diameter, thickness, refractive index, or number of diffusive particles than a light extraction dot on the front surface. In another aspect, the lighting apparatus may include a group of light extraction features on one side of the panel. The light extraction features may comprise dots and by varying the opaqueness of the dots, light may be extracted only toward one side, or both sides, of the lighting apparatus.

In another aspect, the light source in the lighting apparatus may comprise a light emitting diode, a fluorescent light, a plurality of light emitting diodes disposed with respect to the panel such that light emitted from the diodes is injected at one or more edges of the panel, or a plurality of light emitting diodes disposed along two opposite edges of the panel.

According to another embodiment, the invention comprises a method of manufacturing a lighting apparatus comprising optically coupling a light source to an at least partially transparent panel comprising a planar back surface and a planar front surface, the panel disposed in conjunction with the light source such that light from the light source is input into at least one edge of the panel and guided therein and printing a plurality of light extraction features on the panel back surface, the plurality of light extraction features configured to reflect light incident on the panel back surface and extract light from the light source through the panel front surface. In another aspect, the plurality of light extraction features are printed on the panel using an ink jet printer or by screen printing.

According to another embodiment, the invention comprises a lighting apparatus comprising an at least partially transparent panel comprising a planar back surface and a planar front surface for propagating light therebetween and a plurality of light extraction dots disposed on the panel back surface, each light extraction feature comprising an inner layer disposed on the panel back surface and outer layer disposed at least partially on the inner layer, the inner and outer layer having a different light reflective characteristic. In one aspect, the inner layer may reflect light of a first color and the outer layer may reflect light of a different second color.

In another embodiment, the invention comprises a light apparatus comprising a light source, an at least partially transparent panel comprising a planar back surface and a planar front surface and configured to receive light provided from the light source through an edge of the panel and propagate the light in the panel and a plurality of light extraction dots disposed on the panel front surface, the plurality of light extraction dots configured to extract light propagating in the panel through the panel back surface. In one aspect, the light extraction dots comprise diffusive particles. In one example, the light extraction dots are configured to extract light propagating in the panel through the panel front surface. In one aspect, the light extracted through the panel front surface may be of a different color than the light extracted through the panel back surface. In another example, the light extraction dots are configured to extract colored light through the panel back surface different than the color of light provided by the light source.

According to another embodiment, the invention comprises a light apparatus comprising an at least partially transparent panel comprising a planar front surface and a planar back surface and configured to receive light provided from a light source through an edge of the panel and propagate the light within the panel and a film bonded to the panel back surface, the film having a plurality of light extraction dots disposed thereon such that the film is disposed between the panel back surface and the plurality of light extraction dots, the plurality of light extraction dots configured to extract light propagating in the panel through the panel front surface. In one aspect, the light apparatus may comprise a light source and/or an adhesive disposed between the film and the panel. In one aspect, the adhesive is a pressure sensitive adhesive. In one example, the light extraction dots comprise diffusive particles and/or are configured to extract light propagating in the panel through the panel back surface. In another example, the light extraction features are configured to extract colored light through the panel front surface different than the color of light provided by the light source. In one embodiment, the light extraction features may extract a different color through the panel back surface than the panel front surface.

According to another embodiment, the invention comprises a method of manufacturing a lighting apparatus comprising printing a plurality of light extraction dots onto a sheet and bonding the sheet to a surface of an at least partially transparent light panel having a front and back surface such that the sheet is disposed between the plurality of dots and the panel. In one aspect, the bonding comprises attaching the sheet to the panel using an adhesive having an equal or lower refractive index than the refractive index of the panel such that the light extraction dots are operable to extract light propagating between the panel front and back surface. In another aspect, the bonding comprises attaching the sheet to the panel using heat and/or pressure. In one example, the sheet comprises a clear amorphous thermoplastic or glycol-modified polyethylene terephthalate ("PETG").

DETAILED DESCRIPTION OF CERTAIN EMBODIMENTS

Figure 1:
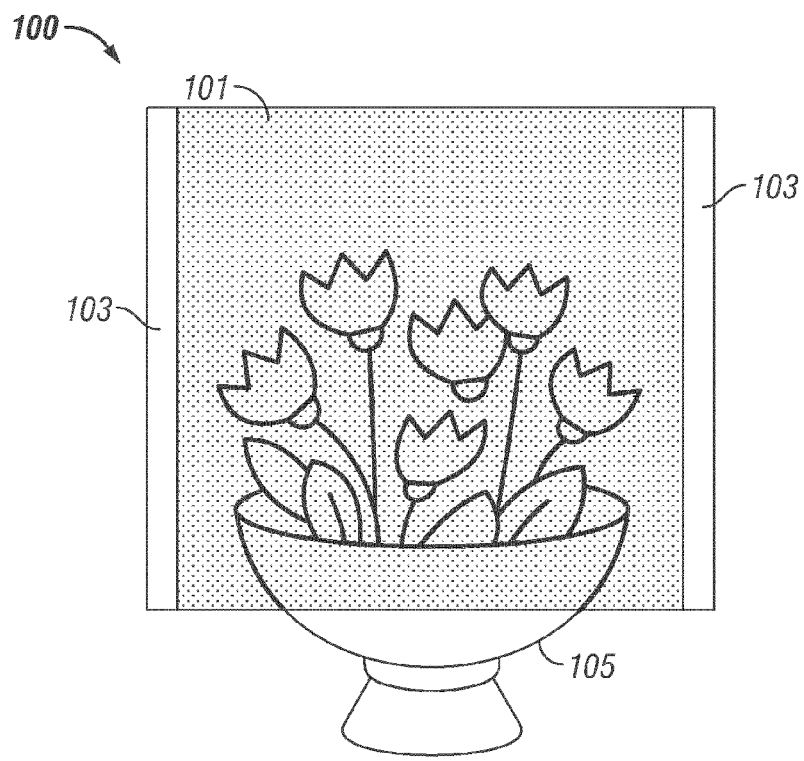
FIG. 1 is a front view of a privacy screen position in front of an object (flowers) where the light source of the privacy screen is either off or decreased thus, allowing a clear view of the object.

The following detailed description is directed to certain specific embodiments of the invention. However, the invention can be embodied in a multitude of different ways. For example, features included in a privacy screen embodiment may also be included in a luminaire embodiment. In this description, reference is made to the drawings wherein like parts are designated with like numerals throughout.

Privacy screen panels (sometimes referred to herein as "panels") may include numerous light extraction features cut or embossed into one or both of the planar surfaces of the panel. The light extraction features may include, for example, grooves, puts, or prismatic features which are formed as part of the panel. However, manufacturing such features can be costly and their use may limit flexibility in design. Alternatively, "dot" light extraction features may be placed (e.g., printed) onto one or both planar surfaces of a panel to extract light in a desired way. Light extraction dots ("dots") as used herein, is a broad term that refers to a mass of material that is configured to have certain optical characteristics, and that is placed on a surface of the privacy screen. In various applications, dots may be configured in various sizes (e.g., length, width, and height), shapes, colors, and compositions to exhibit desired optical characteristics. Some examples of dot cross-sectional shapes includes circles, ovals, generally curvilinear shapes, squares, rectangles, triangles, generally polygonal shapes, and irregular shapes. In a configuration that includes numerous dots, the dots may be disposed in a uniform pattern or another pattern to produce a desired optical effect, and each dot may each be about the same size or the dots can vary in size.

For example, privacy screen panels can include light extraction dots that, when illuminated by a light source that provides light into one or more edges of a panel, obscure viewing objects behind the screen. For ease of manufacturing, the dots can be printed onto any surface of the panel. In some embodiments, light extraction dots are printed on a separate sheet which is then bonded or laminated to a transparent panel forming the privacy screen. In some embodiments, the panel can be configured to have a different visual (or optical) effect when the panel is viewed from either its front or back surface. Such embodiments are particularly useful for privacy screens. In other embodiments, the panel can be designed to extract light out of both the front and back sides of the panel and the panel can then act as a privacy screen in both directions.

Privacy screen panels configured with light extraction features (e.g., printed dots) and a light source can be used as a light "shutter," operating to allow an object to be seen through the privacy screen when the light source is dimmed or off (e.g., an "open" shutter configuration). When the light source is "on," it provides light into the privacy screen panel where the light propagates between the surfaces of the privacy screen panel by total internal reflection. When the light source is on, various embodiments of extraction dots can be used to extract light out of the panel towards a viewer. The increased level of extracted light obscures the view of an object located behind the panel, e.g., on the opposite side of the panel from the viewer, thus forming a "closed" shutter configuration. By actuating the light source when desired, or at certain triggering events, the privacy screen "shutter" can be opened or closed. For example, a door comprising a privacy screen as a light shutter could be configured to actuate the light "closing" the shutter when the door is closed (or when the door locks, or in response to a switch) thus providing privacy, only when needed. In some embodiments, the privacy screen is configured to appear a certain color when the shutter is closed such that a viewer sees a colored panel instead of object through the panel. Privacy screens configured as light shutters can also be implemented instead of windows (e.g., in commercial offices) to provide privacy with an aesthetically pleasing appearance obviating mechanical blinds or shutters. Such light shutters can use any of the embodiments described below, or combinations of these embodiments, where actuating the light source fully or partially obscures the privacy screen to provide the desired level of privacy.

FIG. 1 shows a front schematic view of one embodiment of a privacy screen 100. The privacy screen 100 includes a panel 101 and one or more light sources 103 disposed along left and right edges (relative to the panel 101 illustrated in FIG. 1) of the panel 101. The panel 101 comprises a first (or front) planar side, a second (or back) planar side, a top edge, a bottom edge, a left-side edge, and a right-side edge. The "front" and "back" "sides" are also referred to herein as the "front surface" and the "back surface", respectively. The light sources 103 may be placed on one or more edges of the panel 101, including all four edges. The front planar side is opposite the back planar side. For clarity of description, the embodiments will generally be described in relation to a front side and a rear side, where the front planar side is referenced as pointing out of the page, unless stated differently, and is also described as being closer to a viewer than the back planar side. However, one of skill in the art will appreciate that the panel can be disposed in any direction during use, including flipped front to back; accordingly every embodiment and example described herein with reference to the front surface can also be implemented on the back surface and vise-versa.

Figure 2:
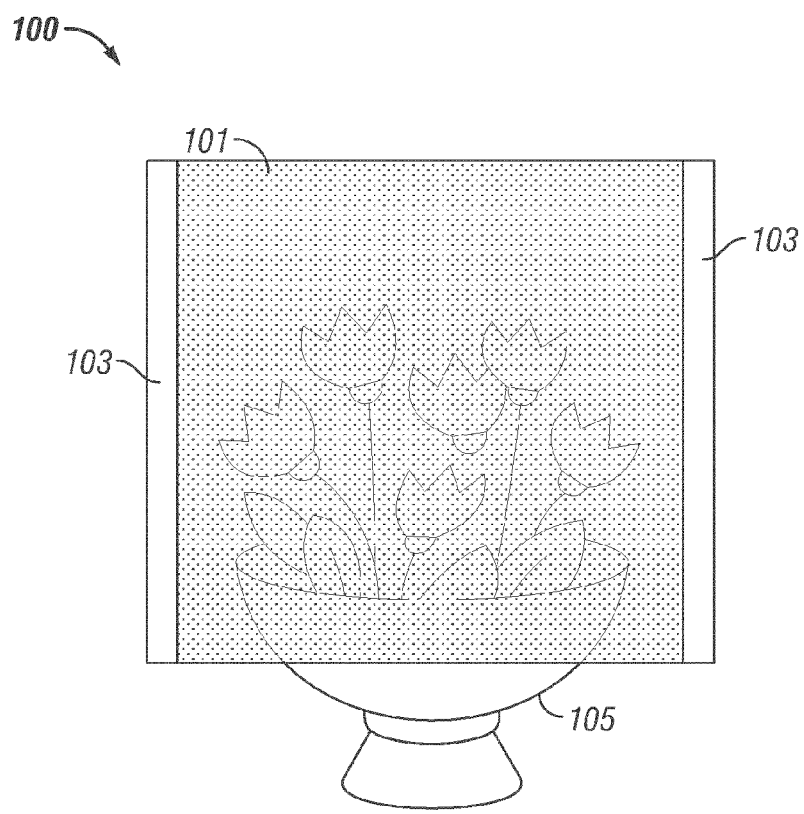
FIG. 2 is a front view of the privacy screen of FIG. 1 where a light source provides light into the privacy screen and at least a portion of the light is emitted from the front of the privacy screen changing the appearance of the object as viewed through the privacy screen.

In some embodiments, the front planar side and back planar side may have approximately the same surface area. However, it is possible they could be different in size, for example, in embodiments where the edges are slanted (e.g., not perpendicular to the front and back surfaces). The front planar side and back planar side may be dimensioned to mask at least a portion of a particular object 105 when the privacy screen 100 is placed in front of the object. For example, the front planar side and back planar side may be 4'×8'. When the light sources 103 are dimmed or turned off the transparency of the panel is affected by the optical properties of light extraction features present on the transparent panel that affect ambient light; accordingly, the panel 101 may appear partially transparent. As shown in FIG. 2, when the light sources 103 are turned on, the panel 101 appears bright and opaque. Thus, a privacy screen 100 may be used to shield an object 105 or the area behind the privacy screen 100 from a viewer. When lit, the panel 101 can contribute to the level of apparent transparency of the screen 100. If the panel 101 is brightly lit by the light sources 103, objects behind the screen 100 may be hidden from a viewer as the contrast of the scene viewed through the panel 101 is reduced. The light extracted from the panel toward the viewer can be altered by varying the output of the light sources 103. In some embodiments, the luminance of the light extracted towards a viewer through the panel 101 is approximately 100 times greater than the luminance of light emitted from or being reflected from the object 105, viewed through panel 101 and the object is completely obscured such that the viewer will no longer be able to distinguish the object due to limitations of human vision. In other embodiments, the luminance of light extracted towards a viewer is approximately 50 times greater than the luminance of light emitted from or reflected from the object 105 through the panel 101 and the object is only partially obscured. Thus, a panel 101 may be used to completely or partially obscure an object 105 to one or more viewers. In some embodiments, the object behind screen 101 may be moving, in which case the ratio of luminance may need to be higher, due to the ability of human vision to detect moving objects more easily than static objects.

The amount of light required to completely or partially obscure an object 105 to a viewer depends on the relative difference of luminance between the object 105 and the panel 101, when the object is viewed through the panel 101. The luminance of the object 105 depends on ambient and artificial light incident on the object 105, and any losses through the panel 101. The luminance of the panel 101 is affected by light extracted from the panel. In one example, an object in the family room in a standard home may have an apparent luminance of about 15 candela per square meter ($cd/m^2$) requiring a panel 101 luminance of approximately 1,500 or more $cd/m^2$ in order to completely obscure the object behind the panel. In another example, an object 105 in an office has an apparent luminance of about 50 $cd/m^2$ and a panel 101 luminance of approximately 5,000 or more $cd/m^2$ is required to completely obscure the object behind the panel.

Figure 3:
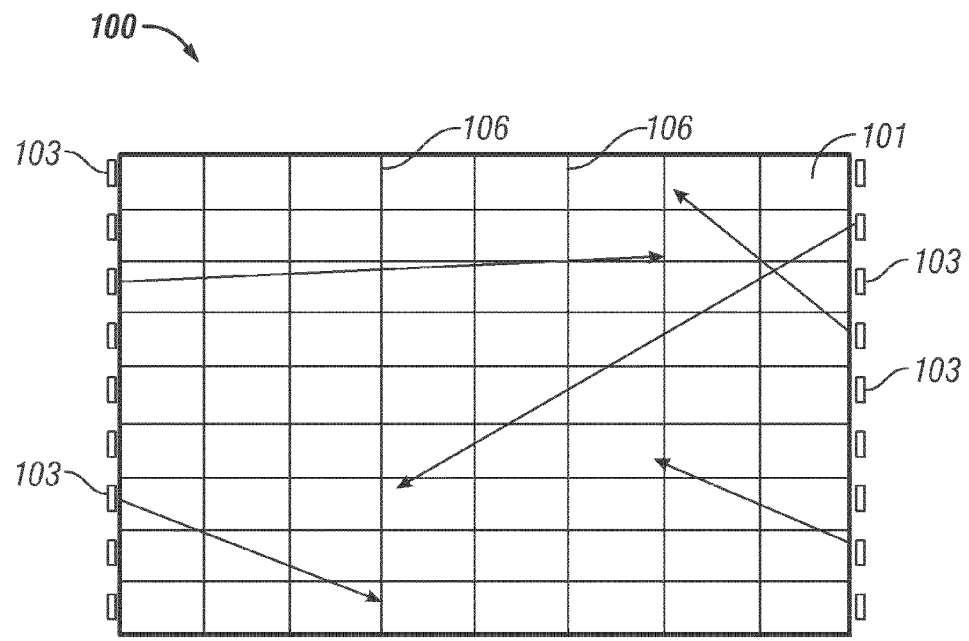
FIG. 3 is a front view of a privacy screen schematically illustrating one embodiment having machined light extraction features.
Figure 4:
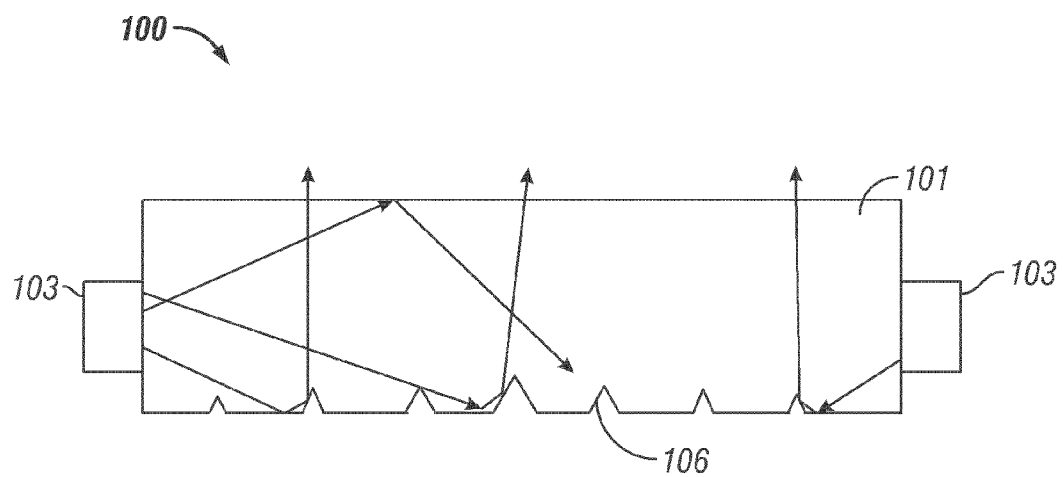
FIG. 4 is an edge view of a privacy screen schematically illustrating one embodiment of a privacy screen having machined light extraction features.

The form, dimension, and distribution of the light turning/extraction features (not shown) impact the lit and unlit visual appearance of the privacy screen 100. Design of these features and their configuration on the panel 100 can be made to optimize both the lit and unlit state of the screen 100. Printed dots make an effective light extraction medium and offer unique advantages in the design of a flat panel luminaire or privacy screen 100. Such dots can include one or more diffusive materials, for example, TiO2, in the form of an ink or paint Turning to FIG. 3, a front schematic view of an embodiment of a privacy screen 100 is shown. In this example, the privacy screen 100 includes turning facets 106. These turning facets are configured to extract light propagating within the panel 101 that is input into the panel 101 by the light sources 103. The turning facets 106 may be embossed or machined into panel 101. The light sources 103 may comprise light emitting diodes (LEDs) or any other suitable light source including linear light sources. As shown in the top edge view of the privacy screen 100 in FIG. 4, light may propagate from the light sources 103 through the panel 101. Light propagating through the panel 101 can be trapped within the panel 101 by total internal reflection ("TIR") until it encounters light turning facets 106. When the light encounters light turning facets 106, some of the light may be extracted from the transparent panel and be turned towards the front (or back) planar side making the privacy screen 100 appear bright to a viewer. However, turning facets 106 or light extraction features that are machined or embossed in the panel 101 may limit the flexibility of the privacy screen 100 and cost more to manufacture than light extraction features that are printed on the panel 101. In some embodiments, light extraction dots (for example, as described herein below) are disposed on one or more surfaces of the panel 101 (shown in FIGS. 3 and 4) to enhance the light extraction properties of the panel.

Figure 5:
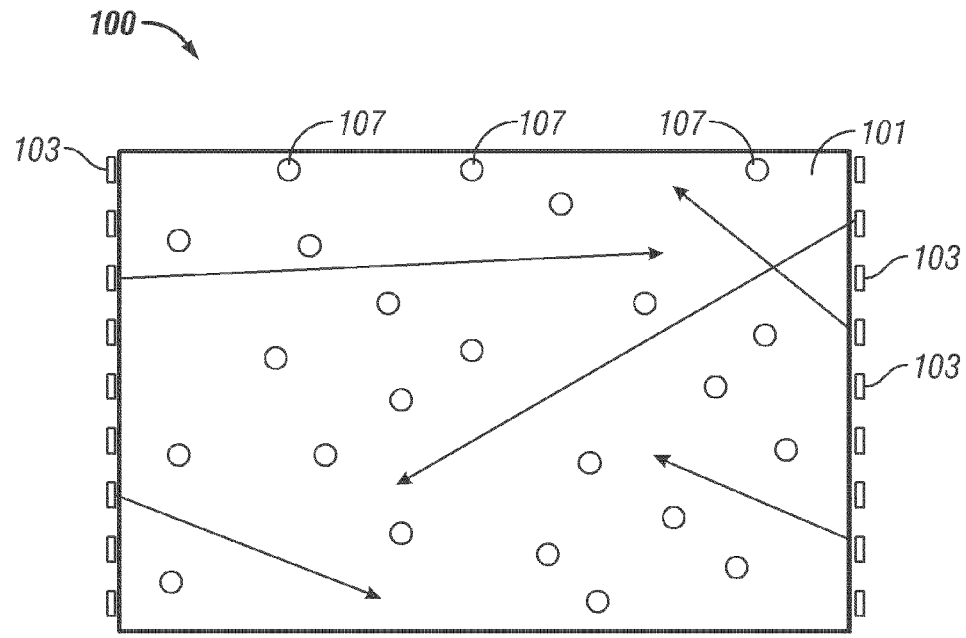
FIG. 5 is a front view schematically illustrating one embodiment of a privacy screen having printed light extraction features.

In the embodiment illustrated in FIG. 5, printed light extraction "dots" 107 can be used on a privacy screen or luminaire as a flexible light extraction feature that may enable a range of properties not possible with other light extraction methods. The dots 107 may be a mass of material that is added to the surface of the panel 101. The dots 107 may vary in size and shape. Examples of suitable cross-sectional shapes include circles, ovals, generally curvilinear shapes, squares, rectangles, triangles, generally polygonal shapes, and irregular shapes. The dots 107 may each be about the same size or the dots can vary in size from one dot 107 to another.

Figure 6:
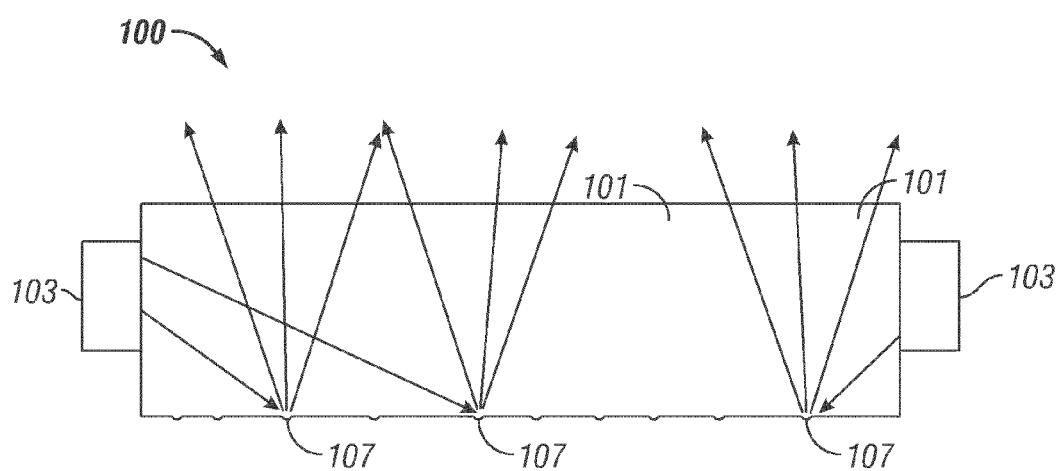
FIG. 6 is an edge view schematically illustrating one embodiment of a privacy screen having printed light extraction features.

As shown in FIGS. 5 and 6, dots 107 may be printed upon the front, back or both front and back surfaces of the panel 101 to extract light input into the panel 101 by light sources 103. Printed dots 107 can be used to tailor the transparency and diffusion of the panel when in ambient light, un-illuminated by a light source 103. Additionally, dots 107 can be used to create uniform or non-uniform light extraction, with light output on the front, back, or both sides of the panel 101. When the panel 101 is illuminated by the light sources 103, the dots 107 can be used to direct light toward a viewer, effectively reducing the contrast of any image seen through the panel in order to act as a privacy screen. Also, through choices of materials, printing, and patterns, the lit and unlit properties of the panel 101 can be largely independently controlled. For example, large dots 107 may be used to limit the transmission through the panel 101 when the light sources 103 are dimmed or unlit. Similarly, a high concentration of smaller dots 107 can limit the transmission through the panel 101 when the light sources 103 are dimmed or unlit. The large or small dots may comprise, for example, diffusive particles or opaque materials, and be configured thicker or with a higher density to limit light transmission through the panel. In some embodiments, a low concentration of smaller dots 107 may be used to allow transmission through the panel 101 when the light sources 103 are dimmed or unlit.

Still referring to FIGS. 5 and 6, printed dots 107 used as an alternative to machine/embossed features offer a low cost, flexible design (e.g., controllable efficiency and uniformity), and flexibility of panel 101 material (e.g., dots can be used on many substrates including glass and plastic). Additionally, the dots 107 can have diffusion characteristics and thus can mitigate the need for a top diffuser. The dots 107 can be simple to manufacture, may require a low capital expenditure to manufacture, and are highly configurable. For example, the dots 107 may be printed onto the panel 101 by an ink jet printer, screen printing techniques, or any other ink printer. The dots may also be rolled, splattered, or sprayed onto the panel 101. The dots in any of the embodiments described herein can be formed by any of these processes, unless specifically stated otherwise. The dots 107 may be printed on both sides of the panel 101 to create a dual-faced light extraction luminaire or privacy screen. In one example, a panel 101 may have a thickness of equal to greater than about one fourth of an inch for a four foot wide panel.

Figure 7:
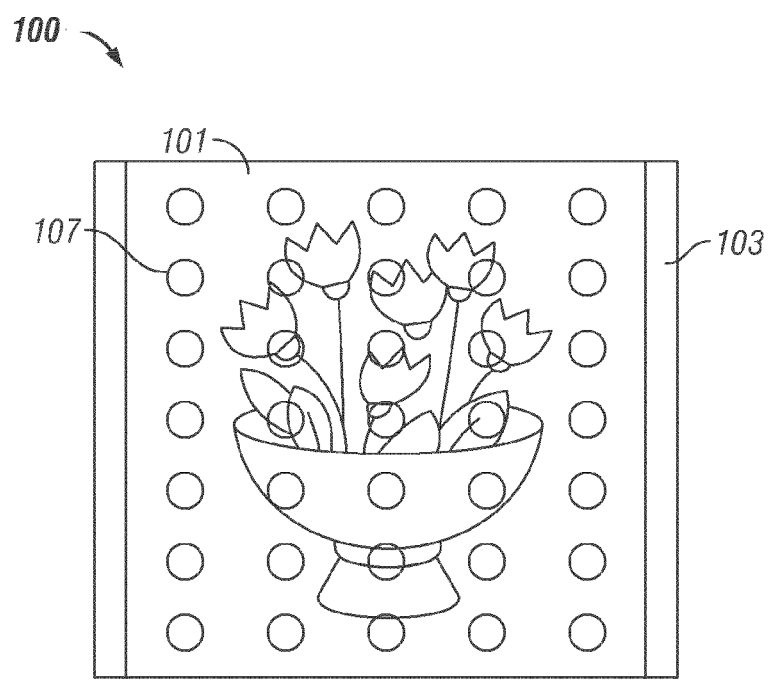
FIG. 7 is a front view schematically illustrating a privacy screen having light extraction features printed on the front and/or back surface in a uniform pattern.

Turning now to FIG. 7, a front schematic view of one embodiment of a privacy screen 100 is shown. The privacy screen 100 includes at least one light source 103 and a panel 101. Light extraction dots 107 are disposed onto at least one side of the panel 101 to extract light that is input into the panel 101 by the at least one light source 103. As shown in FIG. 7, the dots 107 may be large enough and patterned such that objects placed behind the privacy screen 100 may be partially obscured by the dots 107 when the light source 103 is dimmed, or unlit. One or more characteristics of the dots 107 can affect light reflected and/or transmitted through the panel 101. For example, the dots 107 illustrated in FIG. 7 can be configured in various embodiments to have a certain diameter, thickness, pattern, composition including binder materials, diffusive particles, color reflective particles, and multiple layers, as described in reference to FIGS. 8-18. Also, the total visual optical effect of the panel 100 can be affected by one or more optical elements (e.g., that also diffuse, reflect, or refract light) placed either behind or in front of the panel 101 (with respect to a viewer), for example, as described in reference to FIGS. 19 and 20.

Figure 8:
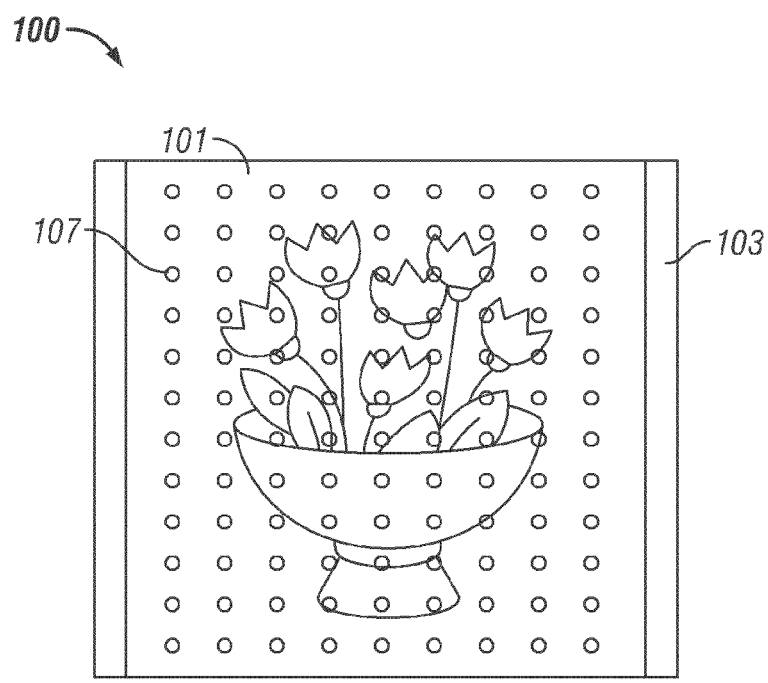
FIG. 8 is a front view of a privacy panel illustrating an embodiment where light extraction features smaller than those shown in FIG. 7 are printed on a front and/or back surface in a uniform pattern.

Another embodiment of a privacy screen comprising dots 107 is shown in FIG. 8. The dots 107 in FIG. 8 are smaller in diameter than those illustrated in FIG. 7, and are disposed in a pattern where the center of the dots are positioned closer together in a "finer" dot pattern. The dots 107 and pattern can be designed to extract the same amount of light as the larger dots in FIG. 7 when illuminated, but the dots in FIG. 8 will be less visible at a distance. The fine dot pattern comprising a larger number of dots 107 than the coarse dot pattern illustrated in FIG. 7, and smaller dots 107, may obviate the need for a diffuser to create even illumination.

Figure 9:
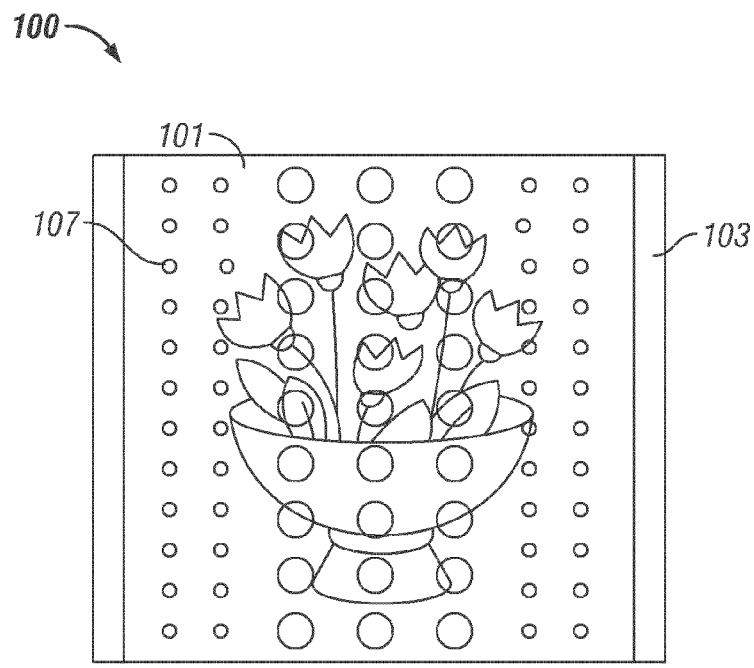
FIG. 9 is a front view of a privacy panel schematically illustrating an embodiment having light extraction features of various sizes printed on the front and/or back surfaces in a non-uniform pattern.

FIG. 9 illustrates another embodiment of a privacy screen 100 that includes a panel 101, a light source 103 positioned along the left and right sides of the privacy screen 100. In the embodiment, as well as the other embodiments described herein, the light source 103 can alternatively be disposed along one side, or along three or four side of the screen 100. The dots 107 in this embodiment are disposed on the panel 101 in a pattern where the spacing between adjacent dots changes in relation to the distance to the light source 103. In this example the distance between adjacent dots decreases as the distance from the light source 103 increases. Also, the size and pitch (e.g., the distance between dots) of the dots 107 changes (increases in this example) as the distance from the light source 103 increases. Such a pattern can be used to extract a uniform amount of light from the panel 101 even though the center portion of the panel is farther from the light source 103. Changing the composition of the dots 107 (e.g., the number and type of diffusive particles, the type of binder material) and/or their configuration (e.g., two or more layers, disposed partly or wholly on an isolation layer) may also help extract more light from dots 107 located in the center of the display panel 107. In other embodiments, the dots 107 may vary in size, shape, spacing and composition such that the dots 107 affect the reflective and transmission characteristics of the panel 101 when the privacy screen 100 is lit by the light source 103 and/or under ambient light conditions. Printed dots provide more flexibility in design and manufacture compared to alternatives—such as grooves, pits, and prismatic features.

Figure 10:
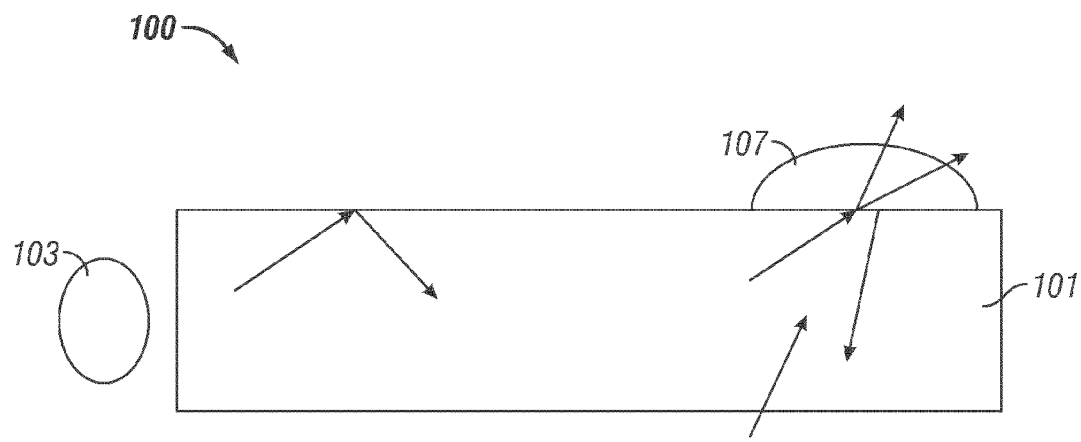
FIG. 10 is an edge view schematically illustrating one embodiment of a privacy screen having dot light extraction feature printed on a surface of the panel.
Figure 11:
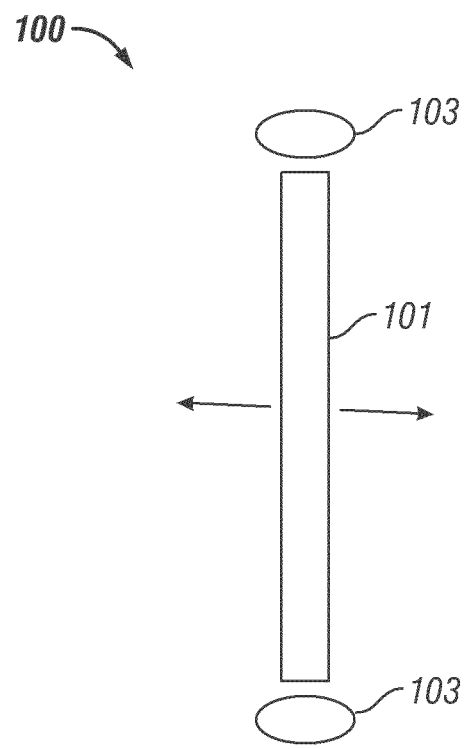
FIG. 11 is an edge view schematically illustrating one embodiment of a privacy screen that is configured to emit light out of its front and back surfaces.

Turning now to FIG. 10, an edge view of a privacy screen 100 is shown. The privacy screen 100 includes a light source 103, a panel 101, and a dot 107. Light emitted by the light source 103 is trapped in the panel 101 by total internal reflection until the TIR is frustrated by the light encountering dot 107. The dot 107 has a refractive index greater than or equal to the refractive index of the transparent panel such that some of the light enters the dot 107 and is scattered, some of the light being extracted. Some of the light scattered by the dot 107 is scattered and/or reflected back into the panel 101. The light reflected or scattered back into the panel 101 will continue travelling along the panel 101 if it enters the panel 101 at a lower angle that allows it to propagate in the panel 101 by TIR. Additionally, if the dot 107 is partially transparent, some light may emerge through the other side of the dot 107, allowing for two side illumination from the panel 101. Light that is scattered into the panel 101 from the dot 107 that enters the panel 101 at a higher angle will emerge from the panel 101 after breaking TIR. Accordingly, as illustrated in FIG. 11, a privacy screen 100 may be configured for dual sided light extraction (on the front planar side and back planar side) when dots are printed on one or both sides of the panel 101. In some embodiments, optical characteristics of dots disposed the front and back sides differ, such that the appearance of the panel differs when viewed from the front or back sides.

Figure 12:
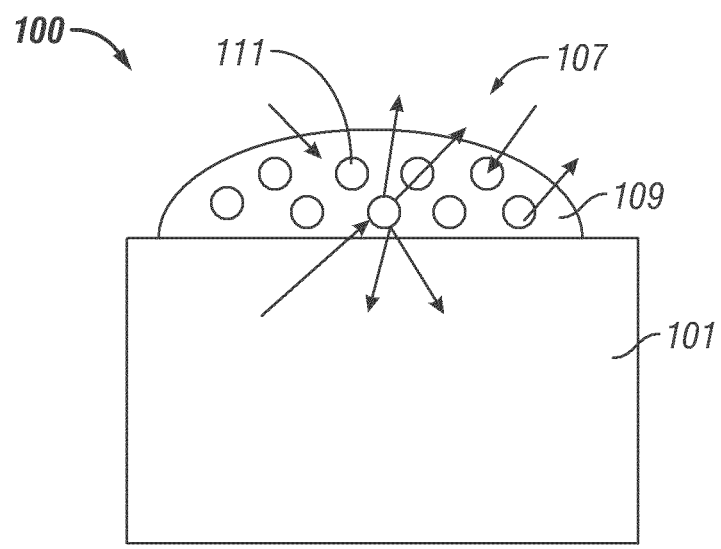
FIG. 12 is a close-up edge view of a privacy screen schematically illustrating one embodiment of a dot light extraction feature.

Turning now to FIG. 12, a close-up edge schematic view of a privacy screen 100 is shown according to one embodiment. The privacy screen 100 includes a panel 101 and a plurality of dots, FIG. 12 illustrating an exemplary single printed dot 107. The dot 107 includes a binder material 109 and a plurality of diffusive particles 111. The diffusive particles 111 can refract, reflect, and scatter light. Depending on their configuration, such dots can appear transparent but diffuse, or they may appear at least partially opaque. The dot 107 may extract light from within the panel 101 when the refractive index of the binder material 109 is equal to or greater than the refractive index of the panel 101. The diffusive particles 111 may extract light from within the binder material when the refractive index of the diffusive particles is greater than the refractive index of the binder material 109. In one example, the diffusive particles 111 comprise a material having a high refractive index (e.g., >2). For example, the diffusive particles may comprise titanium dioxide ("$TiO_2$"), or zinc oxide ("ZnO"). Varying the refractive index of the binder material 109 provides a degree of control over light extraction that is independent of the size and shape of the light extraction feature. For example, a large dot (covering a relatively large coverage area on the panel) extracts more light than small dot (having a relatively small coverage area on the panel). Light extraction from the panel 101 may also be controlled by disposing the dots in denser or more sparse configurations.

Figure 13:
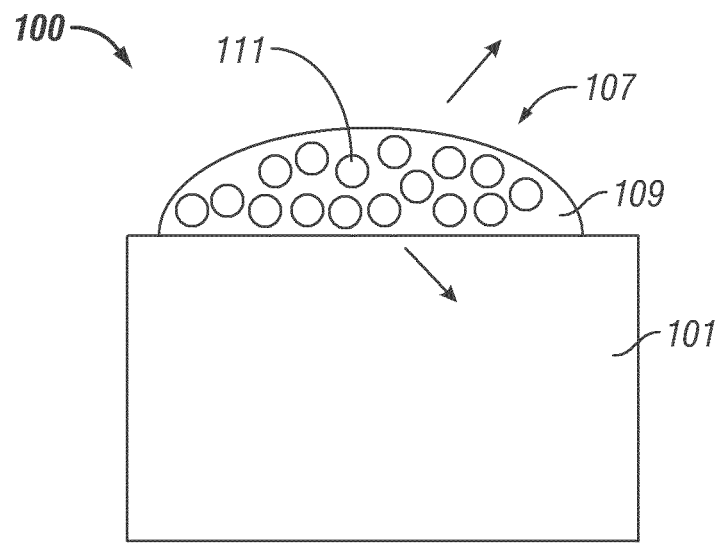
FIG. 13 is a close-up edge view schematically illustrating one embodiment of a dot light extraction feature having a greater particle density than the embodiment shown in FIG. 12.
Figure 14:
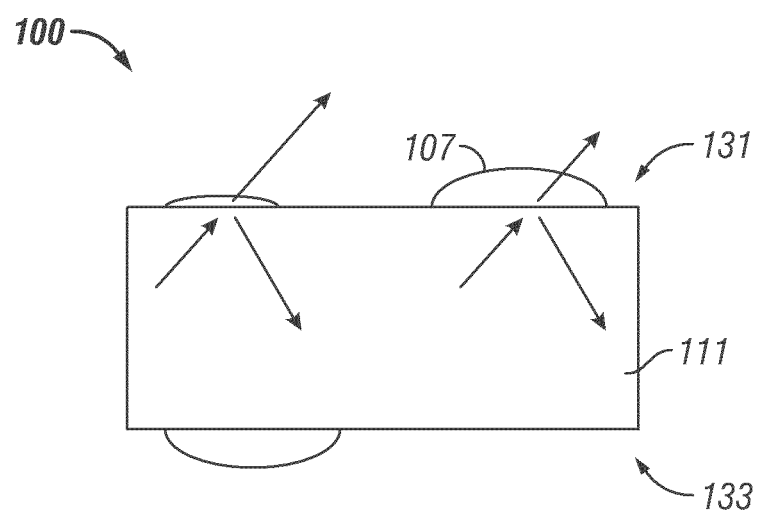
FIG. 14 is an edge view schematically illustrating an embodiment of a privacy screen having dot light extraction features of various sizes printed on the front and back surfaces.

FIG. 13 illustrates another close up view of an embodiment of a panel 101 that can have a plurality of light turning dots, illustrated here by a single dot 107. Dot 107 has a greater diffusive particle 111 density than the dot shown in FIG. 12. Higher diffusive particle 111 density will scatter more light back into the panel 101 and allow less light to diffuse through the dot 107. Variations in the characteristics of diffuser particles 111, including refractive index, will alter diffuser properties. For example, diffuser particles 111 having a high refractive index will contribute to greater light scattering. In addition to varying the refractive indexes of the binder material 109 and the diffusive particles 111, the light extraction properties of a dot may also be controlled by dot size and density. For example, large dots extract more light than smaller dots. As shown in FIG. 14, a printing process can be used to control printed side 131 and panel side 133 light extraction. The natural meniscus of a larger dot, larger ink volume, or layered printing process can be used to control dot thickness and therefore control light scattered through the dot 107. Thicker dots will extract less light on the printed side 131 and extract more light on the panel side 133. Light extraction on each side of the panel 101 may be controlled through printing dots on both sides. In some embodiments, dots having two or more different configurations of diffusive particles can be printed on the same side of the panel 101, or on both sides.

Figure 15:
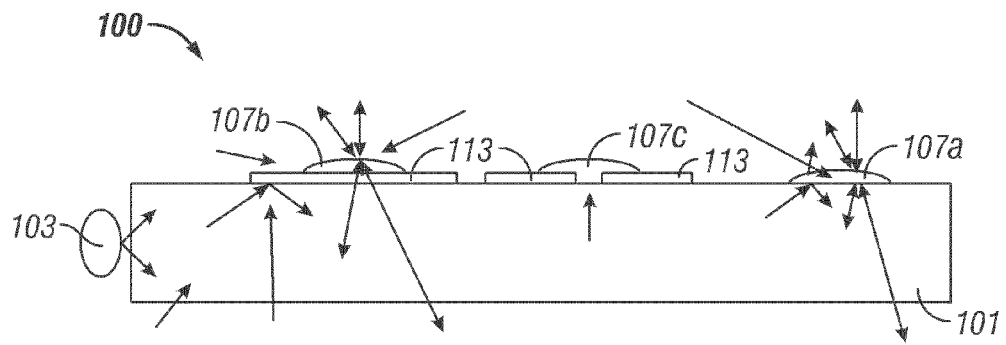
FIG. 15 is an edge view schematically illustrating one embodiment of a privacy screen having isolating layers disposed between portions of dot light extraction features and the transparent panel.

Turning now to FIG. 15, an edge view of a privacy screen 100 is shown. The privacy screen 100 includes a panel 101 and a light source 103. Isolating layers 113 are disposed onto the panel 101. The isolating layers 113 may be disposed between a portion or all of a dot 107 and the panel 101. As shown, dot 107b is disposed upon an isolating layer 113, a portion of dot 107c is disposed upon isolating layer 113, and another portion of dot 107c is disposed upon panel 101. The isolating layers 113 may have a refractive index that is less than the refractive index of the panel 101 to prevent frustration of TIR by the dots 107. For example, when a dot is printed directly on the panel 101, both internal light from the light source 103 and external light impinging on the panel 101 will interact with the dot 107. However, as shown, dot 107b will not interact with light traveling within the panel 101 because TIR will not be frustrated by the low refractive index isolating layer 113. Additionally, external light impinging on dot 107b from the dot printed side of the panel, or via the opposite side of the panel 101 may break TIR at the interface between the dot and the panel.

The isolating layers 113 may be used to fully or partially shield the internal light within the panel 101 from the light extracting dots 107b,c. Printed dots 107 provide a unique way to allow independent control of lit and unlit light panel aesthetics when used with isolating layers 103. Non-light extracting dots 107c can be included in the design, which appear identical to light extracting dots to a viewer, but do not extract light or extract a smaller amount of light than light extracting dots. An isolating layer 113 having a lower refractive index under some or all of the dots will prevent light extraction at these locations. Dots may also be completely or partially shielded by the isolation layer 113 to allow a light extraction pattern of variable dot area to be designed to appear uniform to a viewer of the screen 100. The isolating layers 113 may be printed on or bonded to the panel 101. In cases where the isolating layers are bonded to the panel 101, the isolation layer may include a low index adhesive, or a lower index adhesive may be used to bond a separate isolation layer structure. In other embodiments, light extraction can be controlled in one or more dots by using lower index binders that extract less light, by using a lower index diffuser material(s), by varying the thickness of the dot, and/or by varying the diffuse material density.

Figure 16:
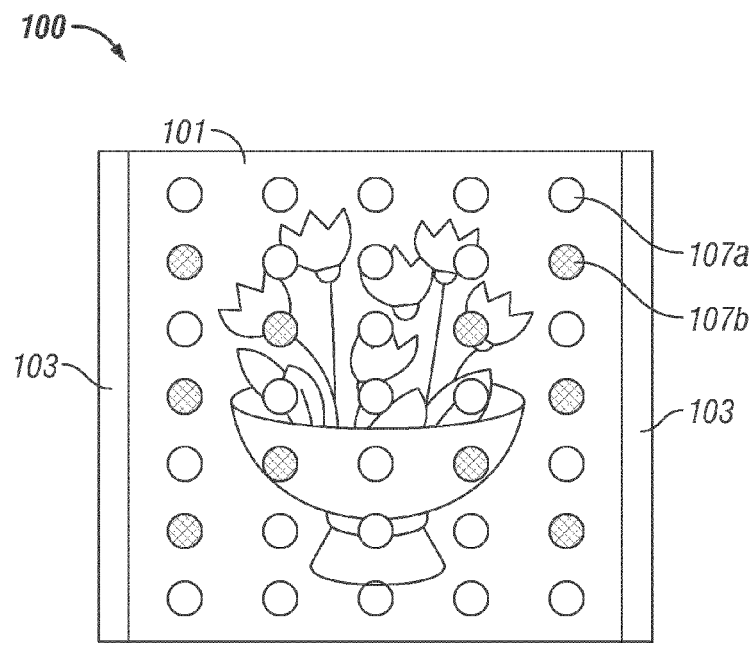
FIG. 16 is a front view schematically illustrating an embodiment of a privacy screen having light extraction dots printed onto the transparent panel and non-light extraction dots disposed on the transparent panel.

FIG. 16 illustrates an embodiment of a privacy screen 100. The privacy screen includes light extracting dots 107a and non-light extracting dots 107b. As shown, the light extraction dot pattern is non-uniform to extract more light away from the edge mounted light sources 103 in order to create even illumination. However, additional non-light extracting dots 107b can be added to create a uniform dot pattern, which is visible when the panel 101 is not illuminated.

Figure 17:
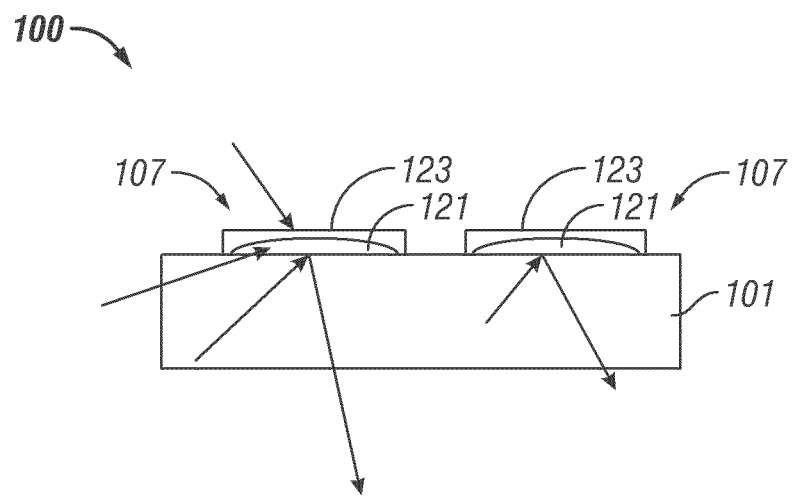
FIG. 17 is an edge view schematically illustrating an embodiment of a privacy screen having multi-layer light extraction dots disposed on the transparent panel.
Figure 18:
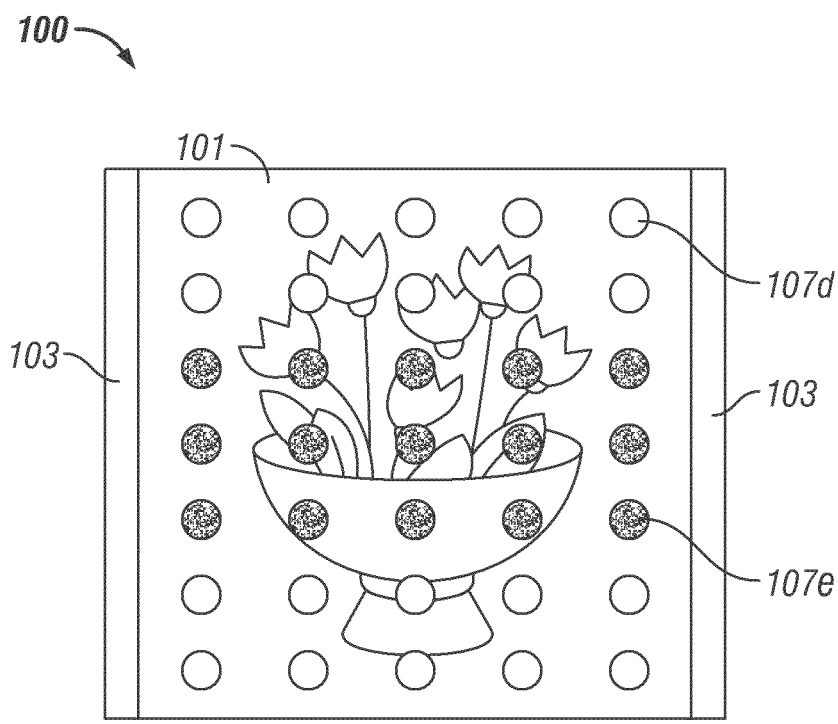
FIG. 18 is a front view schematically illustrating one embodiment of a privacy screen having colored dot and white dot light extraction features printed on the transparent panel.

FIG. 17 illustrates an embodiment of a privacy screen 100. The privacy screen includes light extracting dots 107. The light extracting dots 107 include an outer layer 123 and an inner layer 121. The inner layer 121 and/or outer layer 123 may be colored to add color when illuminated with white light. When the outer layer 123 is white and the inner layer 121 is colored, the dots appear white to a viewer viewing the privacy screen 100 from the same side as the dots 107 and the dots appear colored to a viewer viewing the privacy screen 100 from the other side. As shown in FIG. 18, dots may be patterned to appear different colors to a viewer. For example, dots 107d may appear white to a viewer and dots 107e may appear green.

In another example, a dot 107 with an inner layer 121 and outer layer 123 may extract a different color on each side of the panel. For example, a partially transparent dot 107 with a white inner layer 121 and a green outer layer 123 will extract green on the dot side and a less green, whiter color into the panel and out the other side. An outer layer 123 may reflect light incident from outside the privacy screen 100 while the inner layer 121 may extract light of another color. In such embodiments, the amount of light that is extracted on the dot side of the panel can depend on how much of the outer layer is in contact with the panel surface, and/or how the thickness or opacity of the inner layer (as these characteristics increase, more light will be reflected from the dot within the panel towards the opposite side). Accordingly, a privacy screen 100 can appear colored to a viewer looking through it from one side, while reflecting and/or extracting white light on the other side.

In other embodiments, white dots can be illuminated with colored light. In another embodiment (not shown), a privacy screen 100 could include light extracting dots 107 with inner layers 121 and outer layers 123 on both sides of the privacy screen 100. For example, dots 107 with white inner layers 121 could extract white light toward the back and dots 107 on the back with green inner layers 121 could extract green light toward the front.

Figure 19:
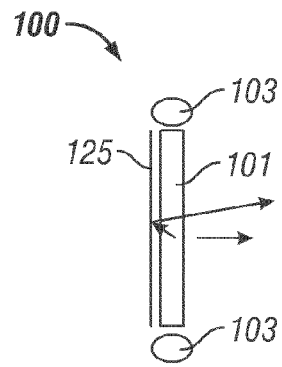
FIG. 19 is an edge view schematically illustrating an embodiment of a privacy screen having a reflector disposed near the transparent panel.
Figure 20:
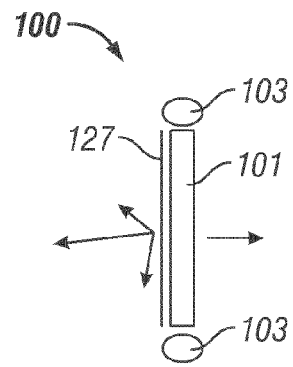
FIG. 20 is an edge view schematically illustrating an embodiment of a privacy screen having a diffuser disposed near the transparent panel.

FIGS. 19 and 20 illustrate edge views of privacy screens 100. Privacy screens (or luminaires) configured as described above may be combined with a diffuser or reflector to further control the specularity or direction of light output in specific applications. FIG. 19 illustrates an embodiment of a privacy screen 100 comprising a reflector 125 configured to reflect light from the panel 101. The reflector 125 may be disposed near the planar back surface of the panel 101 to reflect light that is emitted from the planar back surface through the panel 101 and out of the planar front surface. In some embodiments, the reflector 125 may have a surface area that is similarly sized to the planar back surface in order to reflect substantially all of the light emitted from the planar back surface back through the panel 101. In other embodiments, the reflector 125 may be configured to reflect only a portion of the light emitted from the planar back surface back through the panel 101.

FIG. 20 illustrates an embodiment of a privacy screen 100 comprising a diffuser 127 configured to diffuse light that is extracted from the panel 101. The diffuser 127 may be disposed near one or more planar surfaces of the panel 101 in order to diffuse light that is emitted from the one or more surfaces. For example, in one embodiment, the diffuser 127 may be disposed over the planar back surface of the panel 101 to diffuse light that is emitted from the planar back surface. In some embodiments, the diffuser 127 may have a surface area that is similarly sized to a planar surface of the panel 101 in order to diffuse substantially all of the light emitted from the planar surface. In other embodiments, the diffuser 127 may be configured to diffuse only a portion of the light emitted from a planar surface of the panel 101.

Figure 21:
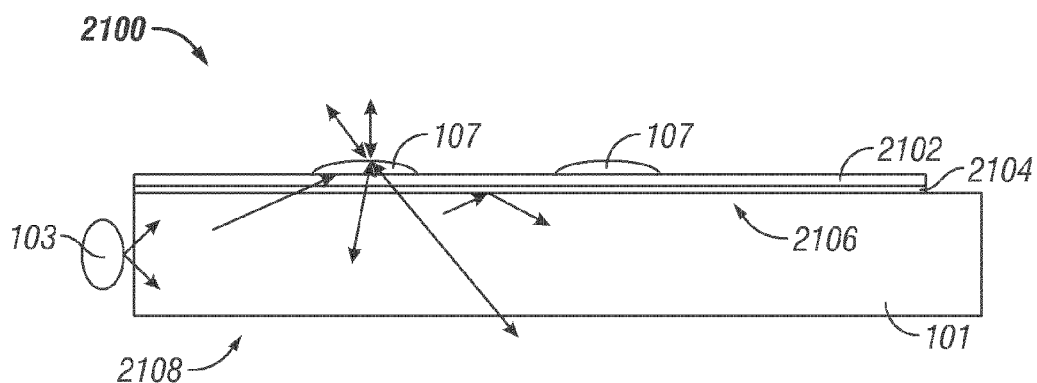
FIG. 21 is an edge view schematically illustrating an embodiment of a privacy screen with a film adhered to the transparent panel where the film has light extraction features disposed on the non-adhesive side of the film.

FIG. 21 is an edge view of an embodiment of a privacy screen 2100 that comprises a light source 103 disposed on one or more sides of a light guide panel 101 (shown here on one side) to provide light to a light guide panel 101. The light extraction dots (features) 107 can be formed (e.g., printed) on a film (or a sheet) 2102. The film 2102 can be attached to a planar front surface 2106 or back surface 2108 of the light guide panel 101. In some embodiments, a first film 2102 with dots 107 ("dot printed film") formed thereon is attached to the front surface 2106 and a second film with dots formed thereon is attached to the back surface 2108 (not shown) of the panel 101. The dots 107 illustrated in FIG. 21 can have any of the characteristics of the light extraction dots described herein, including for example size, composition, and reflective, transmissive, diffusive, and refractive optical characteristics. In some embodiments, a dot printed film 2102 can be attached to the panel 101 in a variety of suitable ways, including but not limited to a heat fusing process, or a sheet or adhesive 2104 (for example, a low index adhesive). In some embodiments, an adhesive film 2104 is disposed between and bonds the panel 101 and the dot printed film 2102.

To manufacture some embodiments, the dots 107 can be first printed on the film 2102. Subsequently the film 2102 is bonded to the light guide panel 101 using an adhesive 2104. In some embodiments, bonding can be via a pressure sensitive adhesive ("PSA") 2104 that has a refractive index equal or lower than the refractive index of the light guiding panel 101. The dot printed film 2102 in turn has a refractive index equal or lower than the adhesive 2104. In other embodiments, the film 2102 can be directly bonded to the panel 101 using materials that fuse together under heat and/or pressure, for example a copolyester like PETG (glycol-modified polyethylene terephthalate) that is a clear amorphous thermoplastic. Dot printed films 2102 can be printed separately from the light panel 101, such as using a low cost litho process, which can reduce manufacturing costs and also separate product manufacturing between suppliers. In some embodiments, two or more films comprising printed dots can be bonded to the light panel in layers, allowing use of layering techniques described in the application relating to isolation layers and multi-layer dots, for example, in FIGS. 15 and 17.

Figure 22:
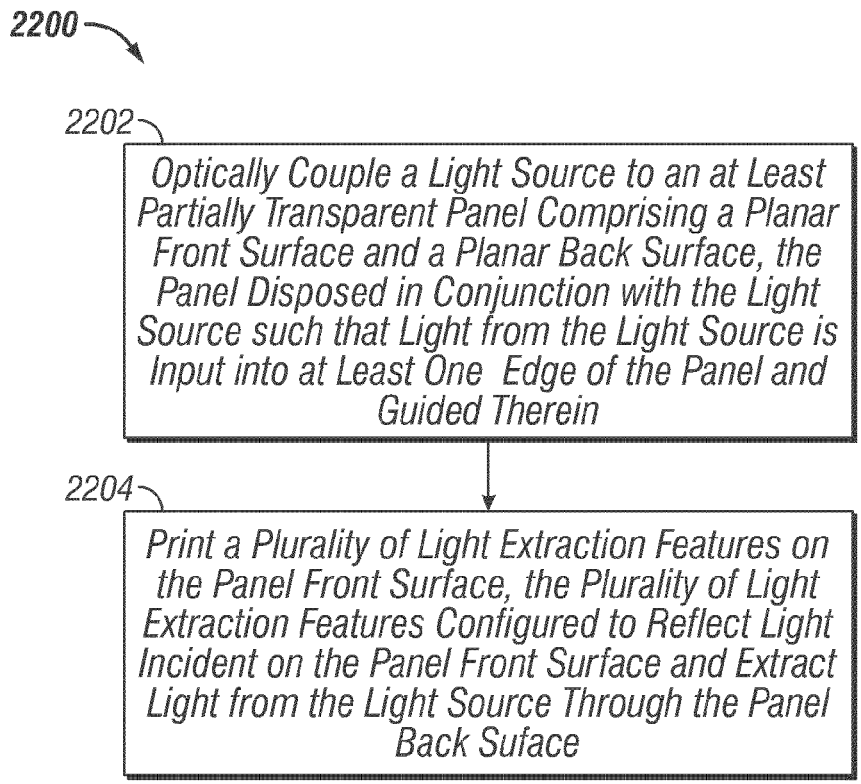
FIG. 22 is a block diagram schematically illustrating an embodiment of a method of manufacturing a lighting apparatus.

FIG. 22 is a block diagram depicting a method 2200 of manufacturing a lighting apparatus, according to one embodiment. Method 2200 includes the steps of optically coupling a light source to an at least partially transparent panel comprising a planar front surface and a planar back surface, the panel is disposed in conjunction with the light source such that light from the light source is input into at least one edge of the panel and guided therein 2202 and printing a plurality of light extraction features on the panel front surface, the plurality of light extraction features configured to reflect light incident on the panel front surface and extract light from the light source through the panel back surface 2204.

Figure 23:
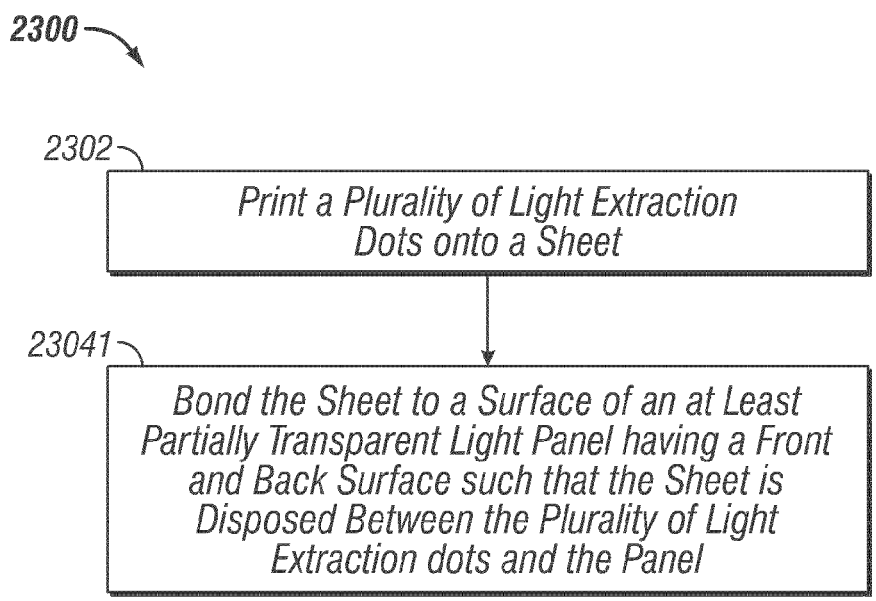
FIG. 23 is a block diagram schematically illustrating an embodiment of a method of manufacturing a lighting apparatus.

FIG. 23 is a block diagram depicting a method 2300 of manufacturing a lighting apparatus, according to one embodiment. Method 2300 includes the steps of printing a plurality of light extraction dots onto a sheet 2302 and bonding the sheet to a surface of an at least partially transparent light panel having a front and back surface such that the sheet is disposed between the plurality of light extraction dots and the panel 2304. In method 2300, the bonding may comprise attaching the sheet to the panel using an adhesive having an equal or lower refractive index than the refractive index of the panel such that the light extraction dots are operable to extract light propagating between the panel front and back surface.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

The invention claimed is:
1. A lighting apparatus, comprising:
an at least partially transparent panel including a planar front surface and a planar back surface, the panel configured to receive light provided from a light source through an edge of the panel and propagate the light within the panel;
a film positioned on the back surface, the film having a plurality of light extraction dots disposed thereon, the plurality of light extraction dots configured to extract light propagating in the panel through the front surface; and a light source, wherein the light source is configured to switch between at least a first mode and a second mode, the light source emitting more light in the second mode than in the first mode;

wherein the plurality of light extraction dots are configured to extract more light in the second mode than in the first mode such that the visibility through the at least partially transparent panel is greater in the first mode than in the second mode.

2. A lighting apparatus, comprising:
an at least partially transparent panel including a planar front surface and a planar back surface, the panel configured to receive light provided from a light source through an edge of the panel and propagate the light within the panel; and
a film positioned on the back surface, the film having a plurality of light extraction dots disposed thereon, the plurality of light extraction dots configured to extract light propagating in the panel through the front surface;
wherein at least one of the plurality of light extraction dots includes an inner layer disposed proximate to the transparent panel and an outer layer disposed at least partially on the inner layer, wherein the outer layer includes a first colored material that reflects ambient light of a first color and the inner layer includes a second colored material that reflects light, propagating within the panel, of a second color.

3. The apparatus of claim 1, further comprising an adhesive disposed between the film and the panel for bonding the film to the panel.

4. The apparatus of claim 3, wherein the adhesive is a pressure sensitive adhesive.

5. The apparatus of claim 1, wherein the film includes a plurality of non-extraction features.

6. A lighting apparatus, comprising:
an at least partially transparent panel including a planar front surface and a planar back surface, the panel configured to receive light provided from a light source through an edge of the panel and propagate the light within the panel; and
a film positioned on the back surface, the film having a plurality of light extraction dots disposed thereon, the plurality of light extraction dots configured to extract light propagating in the panel through the front surface;
wherein the film includes a plurality of non-extraction features; and
wherein the film includes an isolation layer disposed between the plurality of non-extraction features and the back surface, the plurality of non-extraction features and the plurality of light extraction dots disposed in a uniform pattern.

7. The apparatus of claim 6, wherein the plurality of non-extraction features includes one or more dots.

8. A method of manufacturing a lighting apparatus, comprising:
printing a plurality of light extraction dots onto a sheet;
bonding the sheet to a surface of an at least partially transparent light panel having a front and back surface;
optically coupling at least one light source to an edge of the panel, wherein the light source is configured to switch between at least a first mode and a second mode, the light source emitting more light in the second mode than in the first mode;
wherein the plurality of light extraction dots are configured to extract more light in the second mode than in the first mode such that the visibility through the panel is greater in the first mode than in the second mode.

9. The method of claim 8, wherein the sheet is bonded to the back surface and wherein the plurality of light extraction dots is configured to extract light propagating in the panel through the front surface.

10. The method of claim 8, wherein the bonding includes attaching the sheet to the panel using an adhesive having an equal or lower refractive index than the refractive index of the panel.

11. The method of claim 8, wherein the bonding includes attaching the sheet to the panel using heat and/or pressure.

12. The method of claim 8, further comprising disposing a plurality of non-extraction features onto the sheet.

13. The method of claim 12, wherein the non-extraction features include one or more dots.

14. The method of claim 13, wherein the non-extraction features are printed onto the sheet.

15. A method of manufacturing a lighting apparatus, comprising:
optically coupling a light source to an at least partially transparent panel comprising a planar back surface and a planar front surface such that light from the light source is input into at least one edge of the panel and guided therein; and
placing a plurality of light extraction features on the back surface, the plurality of light extraction features configured extract light from the light source through the front surface;
wherein the light source is configured to switch between at least a first mode and a second mode, the light source emitting more light in the second mode than in the first mode; and
wherein the plurality of light extraction features are configured to extract more light in the second mode than in the first mode such that the visibility through the at least partially transparent panel is greater in the first mode than in the second mode.

16. The method of claim 15, wherein the plurality of light extraction features are further configured to reflect ambient light incident on the back surface.

17. The method of claim 15, wherein placing the plurality of light extraction features comprises printing the plurality of light extraction features onto the panel using an ink jet printer.

18. The method of claim 15, wherein placing the plurality of light extraction features on the back surface comprises screen printing.

19. The method of claim 15, wherein the plurality of light extraction features comprises one or more light extraction dots.

20. A method of screening by decreasing the visibility through a panel, comprising:
positioning an at least partially transparent panel comprising a planar first surface and a planar second surface in a location to screen an object or an area, the panel comprising a plurality of light extraction dots disposed on the panel, the light extraction dots configured to extract light propagating within the panel through the first surface of the panel;
providing light into the panel at a first illumination level; and
providing light into the panel at a second illumination level, the second illumination level being greater than the first illumination level, wherein the plurality of light extraction dots are configured to extract more light through the first surface of the panel at the second illumination level than at the first illumination level thereby lowering the visibility through the panel as viewed through the first surface of the panel.

21. A method of screening by decreasing the visibility through a panel, comprising:
- positioning an at least partially transparent panel comprising a planar first surface and a planar second surface in a location to screen an object or an area, the panel comprising a plurality of light extraction dots disposed on the panel, the light extraction dots configured to extract light propagating within the panel through the first surface of the panel;
- providing light into the panel at a first illumination level; and
- providing light into the panel at a second illumination level, the second illumination level being greater than the first illumination level such that more light is extracted through the first surface of the panel at the second illumination level than at first illumination level lowering the visibility through the panel as viewed through the first surface of the panel;
- wherein at least one of the light extraction dots includes an inner layer disposed proximate to the transparent panel and an outer layer disposed at least partially on the inner layer, wherein the outer layer includes a first colored material that reflects ambient light of a first color and the inner layer includes a second colored material that reflects light, propagating within the panel, of a second color.

22. The apparatus of claim 5, wherein the film includes an isolation layer disposed between the plurality of non-extraction features and the back surface, the plurality of non-extraction features and the plurality of light extraction dots disposed in a uniform pattern.

23. The apparatus of claim 22, wherein the plurality of non-extraction features includes one or more dots.

24. The apparatus of claim 1, wherein at least one of the plurality of light extraction dots includes an inner layer disposed proximate to the transparent panel and an outer layer disposed at least partially on the inner layer, wherein the outer layer includes a first colored material that reflects ambient light of a first color and the inner layer includes a second colored material that reflects light, propagating within the panel, of a second color.

25. The apparatus of claim 2, further comprising an adhesive disposed between the film and the panel for bonding the film to the panel.

26. The apparatus of claim 25, wherein the adhesive is a pressure sensitive adhesive.

27. The method of claim 20, wherein at least one of the light extraction dots includes an inner layer disposed proximate to the transparent panel and an outer layer disposed at least partially on the inner layer, wherein the outer layer includes a first colored material that reflects ambient light of a first color and the inner layer includes a second colored material that reflects light, propagating within the panel, of a second color.

* * * * *